(12) United States Patent
Lucy

(10) Patent No.: US 10,898,792 B2
(45) Date of Patent: *Jan. 26, 2021

(54) LEARNING GAME PLATFORM, SYSTEM AND METHOD FOR AN ELECTRONIC DEVICE

(71) Applicant: Lucille A Lucy, Coconut Creek, FL (US)

(72) Inventor: Lucille A Lucy, Coconut Creek, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/416,776

(22) Filed: May 20, 2019

(65) Prior Publication Data
US 2019/0270000 A1 Sep. 5, 2019

Related U.S. Application Data

(62) Division of application No. 14/545,290, filed on Apr. 17, 2015, now Pat. No. 10,350,484.

(51) Int. Cl.
*A63F 13/00* (2014.01)
*A63F 1/00* (2006.01)

(52) U.S. Cl.
CPC ........ *A63F 13/00* (2013.01); *A63F 2001/008* (2013.01)

(58) Field of Classification Search
CPC ............................ A63F 13/00; A63F 2001/008
See application file for complete search history.

(56) References Cited

U.S. PATENT DOCUMENTS

| 5,242,171 A | 9/1993 | Hata .............................. 273/292 |
| 5,310,347 A * | 5/1994 | Brand ....................... A63F 1/00 |
| | | 273/299 |
| 5,556,283 A | 9/1996 | Stendardo et al. ............ 434/188 |
| 5,827,071 A | 10/1998 | Sorensen et al. ............. 434/323 |
| 6,077,080 A | 6/2000 | Rai ................................ 434/170 |
| 6,234,486 B1 | 5/2001 | Wallice ......................... 273/299 |
| 6,276,940 B1 | 8/2001 | White ........................... 434/172 |

(Continued)

FOREIGN PATENT DOCUMENTS

WO WO/2014/140125 9/2014 ........... G06F 3/0485

OTHER PUBLICATIONS

"*Making Learning Fun...*" found at http://www.makinglearningfun.com/themepages/MathDomino.htm.
"*Learn to Play 42*" found at http://texas42.net/.

*Primary Examiner* — David L Lewis
*Assistant Examiner* — Shauna-Kay Hall
(74) *Attorney, Agent, or Firm* — Ernest D. Buff & Associates, LLC; Ernest D. Buff

(57) ABSTRACT

A learning game platform, system and method, for an electronic device executing an app comprises a server for reading medium and storing user information and games, scores, and user progress within a play and learn app platform. The server communicates through the Internet with electronic devices having Internet access operated by at least one player. Registration means allows the player to register with and logon to the play and learn app. Preference selection means enables the player ability to enter user preferences, including age, game selection, skill level. Performance review means determines strength and weaknesses of the player. The platform provides a plethora of game play variations to facilitate learning in a fun inclusive manner.

18 Claims, 44 Drawing Sheets

(56) References Cited

U.S. PATENT DOCUMENTS

| | | | | |
|---|---|---|---|---|
| 6,447,300 | B1 | 9/2002 | Greenberg | 434/188 |
| 6,579,100 | B1 | 6/2003 | Clark | 434/172 |
| 6,910,893 | B2 | 6/2005 | Dillhoff | 434/129 |
| 8,231,389 | B1* | 7/2012 | Berger | G09B 7/00 |
| | | | | 434/322 |
| 8,771,050 | B2* | 7/2014 | Buchner, III | A63F 1/00 |
| | | | | 463/16 |
| 2004/0087363 | A1 | 5/2004 | Bogenn | 436/29 |
| 2007/0167234 | A1 | 7/2007 | Liu | 436/42 |
| 2007/0281285 | A1* | 12/2007 | Jayaweera | G09B 7/02 |
| | | | | 434/156 |
| 2008/0070682 | A1* | 3/2008 | Woody | A63F 13/80 |
| | | | | 463/30 |
| 2008/0256015 | A1* | 10/2008 | Woolf | A63F 13/67 |
| | | | | 706/48 |
| 2009/0017913 | A1 | 1/2009 | Bell et al. | 436/40 |
| 2009/0247253 | A1 | 10/2009 | Leland | 436/13 |
| 2010/0069158 | A1* | 3/2010 | Kim | A63F 13/323 |
| | | | | 463/42 |
| 2012/0149001 | A1* | 6/2012 | Dohring | G09B 5/06 |
| | | | | 434/365 |
| 2012/0175394 | A1 | 7/2012 | Keune | 483/24 |
| 2014/0170613 | A1* | 6/2014 | Jensson | G09B 19/06 |
| | | | | 434/157 |
| 2014/0274303 | A1* | 9/2014 | Funches | A63F 13/67 |
| | | | | 463/23 |

\* cited by examiner

Figure 3b

VARIATION: NUMBER RECOGNITION

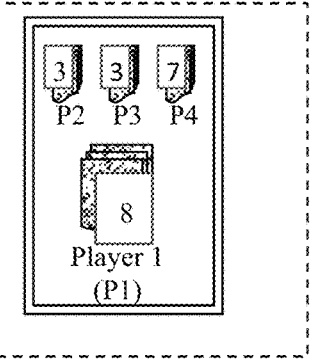

Player selects top card to turn card face up [on-line players compete; and / or player competes with app digital generated player / social media players] on "table" / or electronic device screen Player that has the highest card receives one point for each card played in that turn of the game. The computer will keep a running total of each player's score on his turn which will be shown in the player's box.

If the greatest face value of the face-up cards in the middle of the table are equal there is a challenge. The tied cards stay on the "table" / or digital device screen and both players play the next card of their pile.

If the new face-up cards are equal as well, the challenge continues: each player plays the next card of their pile.

•Ending of Game: Game continues until only one player or no players have cards remaining to play. The winner is the player with the most points shown in their player's box.

Figure 3f

VARIATION: NUMBER RECOGNITION – GAME PLAY

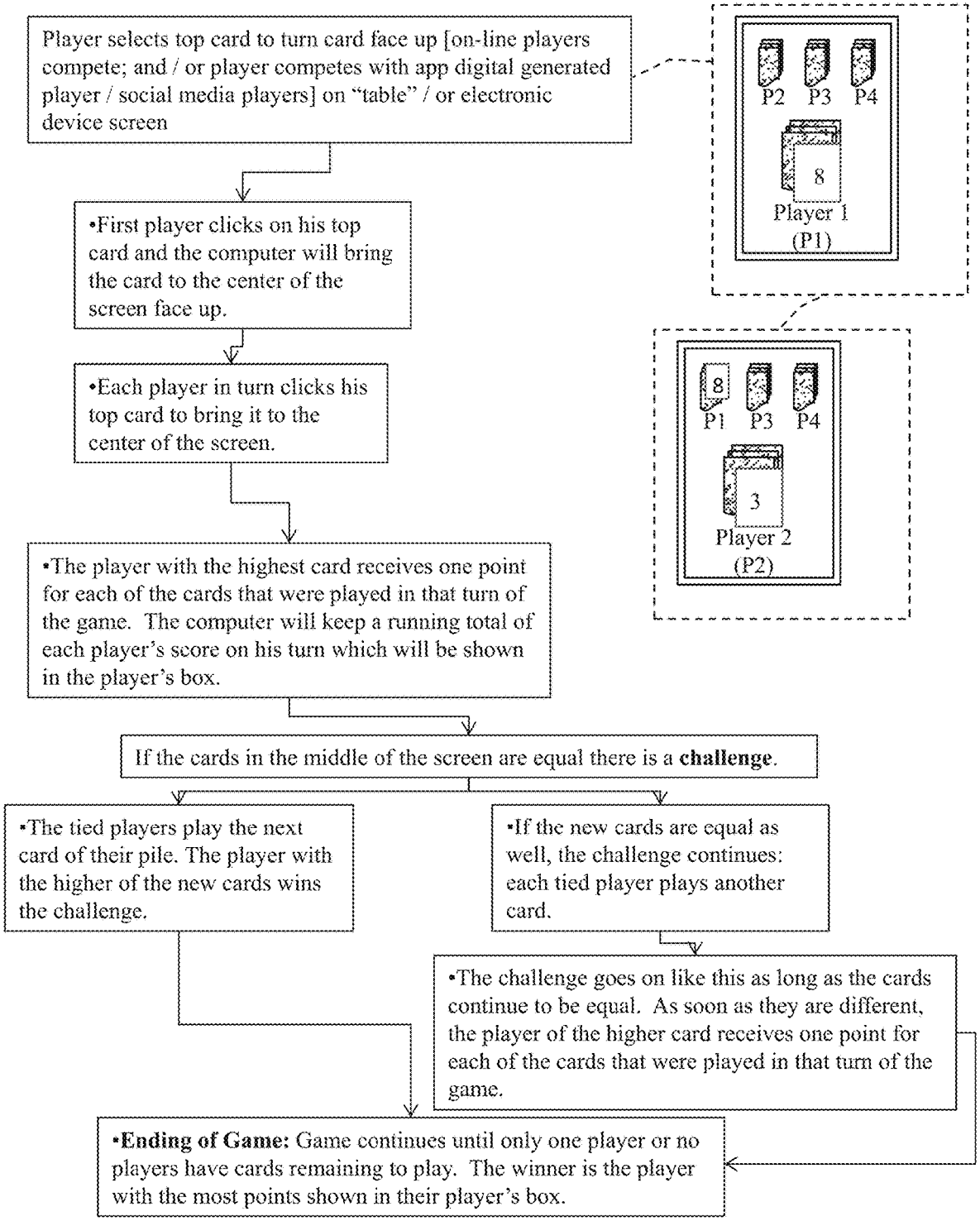

Player selects top card to turn card face up [on-line players compete; and / or player competes with app digital generated player / social media players] on "table" / or electronic device screen

- First player clicks on his top card and the computer will bring the card to the center of the screen face up.

- Each player in turn clicks his top card to bring it to the center of the screen.

- The player with the highest card receives one point for each of the cards that were played in that turn of the game. The computer will keep a running total of each player's score on his turn which will be shown in the player's box.

If the cards in the middle of the screen are equal there is a challenge.

- The tied players play the next card of their pile. The player with the higher of the new cards wins the challenge.

- If the new cards are equal as well, the challenge continues: each tied player plays another card.

- The challenge goes on like this as long as the cards continue to be equal. As soon as they are different, the player of the higher card receives one point for each of the cards that were played in that turn of the game.

- Ending of Game: Game continues until only one player or no players have cards remaining to play. The winner is the player with the most points shown in their player's box.

Figure 4a

COUNTING BY TENS

EDUCATIONAL GOAL: To teach and reinforce number recognition 1 to 100, counting 1 through 100, number sequence and counting by Tens. This game develops fine motor skills by using small muscles in the hands, strengthens eye-hand coordination, allows interaction between adult and child which encourages family unity and creates wonderful memories, and gives adults an opportunity to praise a child when something is done correctly. Playing in real time also enhances the child's expressive language, builds self-esteem, and accomplishes these goals simply by HAVING FUN playing games with family and friends.

AGES: 3 to 7

NUMBER OF PLAYERS: 2 to 4

OBJECTIVE: Each player competes to be the winner of the game.

CONENTS: Three number grids as follows:
    one 1 through 50,
    51 through 100, and
    1 through 100.

White tiles with blue face with black numbers for the numbers used when counting by Tens, all other numbers are white tiles with black numbers.

"Sorry" tiles - white tiles that say "Sorry" on them

SETUP
2 Players – 1 half grid of either, 1 to 50 or 50 to 100. Ten "Sorry" Tiles.
3 Players – One complete grid 1 to 100. Twenty "Sorry" Tiles.
4 Players – One complete grid 1 to 100. Twenty "Sorry" Tiles

Figure 4b

GAMEPLAY

1. One number grid with a pool of corresponding number tiles (face down) is viewed on the screen.

2. First player takes five tiles from the pool to play on the number grid.

3. If one to four "Sorry" tiles (a tile with no number on it) are drawn, player loses that many chances to match a number on the grid. He then places the other tiles correctly on the corresponding numbers on the number grid. The "Sorry" tiles are put in a "discard pile."

4. If five "Sorry" tiles are drawn, player loses his turn and play goes to the next player.

5. After a player places his tiles on the number grid, the computer will calculate his total number of points for that turn:

6. Next player, and then each in turn, takes five tiles and continues in the same manner.

7. Ending the Game: The game ends when players finish matching all blue number tiles on the number grid.

8. The player with the most points is the winner.

- 1 point for each white number tile matched on the number grid.
- 0 points for the "Sorry" tiles.
- 5 points for a blue number tile.

NUMBER RECALL – 0 to 25

EDUCATIONAL GOAL: To teach and reinforce recognition of numbers 0 to 25.
This game develops fine motor skills by using small muscles in the hands, strengthens eye-hand coordination, allows interaction between adult and child which encourages family unity and creates wonderful memories, and gives adults an opportunity to praise a child when something is done correctly.

Playing in real time also enhances the child's expressive language, builds self-esteem, and accomplishes these goals simply by HAVING FUN playing games with family and friends.

AGES: 3 to 7

NUMBER OF PLAYERS: 2 to 4 players

OBJECTIVE: To collect the most matched sets of two.

---

SETUP
Five groups containing two of each number as follows:
•Group 1 – 0 through 5
•Group 2 – 6 through 11
•Group 3 – 12 through 17
•Group 4 – 18through 23
•Group 5 – 24, 25, 12, 15, 19, 13

---

GAMEPLAY
•On each turn, a player chooses two pictures (one at a time). If the numbers match, the player receives one point and takes another turn.
•If the player gets another match he gets another turn until he does not make a match before it goes to the next player.
•When a player chooses two pictures that are not matching numbers, it becomes the next player's turn.
•The computer will keep a running score for each player that will be displayed in the player's box at the end of each player's turn.
•Ending of Game: Continue play in the same manner until all numbers are matched. The winner is the player with the most points.
Variations: 18, 24, and 36 pictures to a game.

Figure 6

ABC RECALL A Memory Game CAPITAL LETTERS - ABC Recall

AGES: 3 to 7
NUMBER OF PLAYERS: 2 to 4 players
CONTENTS: Two sets of identical cards A to Z.
OBJECTIVE: To collect the most matched sets of two.

SETUP
Separate cards into five groups containing two of each capital letter card as follows:
- Group 1 – A through F
- Group 2 – G through L
- Group 3 – M through R
- Group 4 – S through X
- Group 5 - Y and Z plus four other letters used from another group.

Choose one group of cards, and they will be shown face down on the screen.

GAMEPLAY
- On each turn, a player chooses two pictures (one at a time). If the letters match, the player receives one point and takes another turn.
- If the player gets another match he gets another turn until he does not make a match before it goes to the next player.
- When a player chooses two pictures that are not matching letters, it becomes the next player's turn.
- The computer will keep a running score for each player that will be displayed in the player's box at the end of each player's turn.
- Ending of Game: Continue play in the same manner until all letters are matched. The winner is the player with the most points.

Variations: 18, 24, and 36 pictures to a game.

Figure 7a

HAPPY FACE NUMBER DOMINOES
NUMBERS 21 to 31

AGES: 3 to 7
NUMBER OF PLAYERS: 2 to 8
OBJECTIVE: To be the first player to use all of his/her dominoes.

SETUP
• All dominoes face down.
• Each player picks seven dominoes. All other dominoes are set aside as the "Reserve Pile."

GAMEPLAY

• The happy face on the domino is wild. It can be used as any number. The double "Happy Face" domino can only be used as a double.
• The person with the double "21" or the double "Happy Face" domino is the first player, and he/she places it in a vertical position. Double number dominoes thereafter are always placed in a position that is perpendicular to the other dominoes.
• Every time a double number domino is played it must be matched twice before any other numbers can be matched.
• If player has a matching domino, it must be played.
• If player does not have a domino in his/her hand that matches the dominoes already played, then he/she must pick one domino from the "Reserve Pile." If the domino picked can be played, he/she must play it.   If not, the player adds the domino to his/her dominoes and the play goes to the next player in a clockwise direction.
• Play continues until one player has played all of    his/her dominoes.   See Diagram 1, which shows a possible continuous play of a game.

Figure 8a

| |
|---|
| HAPPY FACE LETTER DOMINOES : CAPITAL LETTERS A to H<br><br>AGES: 3 to 7<br><br>NUMBER OF PLAYERS: 2 to 8<br><br>OBJECTIVE: To be the first player to use all of his/her dominoes. |
| SETUP<br>• All dominoes face down.<br>• Each player picks seven dominoes. All other dominoes are set aside as the "Reserve Pile." |
| GAMEPLAY<br><br>• The happy face on the domino is wild. It can be used as any letter. The double "Happy Face" domino can only be used as a double.<br><br>• The person with the double "A" or the double "Happy Face" domino is the first player, and he/she places it in a vertical position. Double letter dominoes thereafter are always placed in a position that is perpendicular to the other dominoes.<br><br>• Every time a double letter domino is played it must be matched twice before any other letters can be matched.<br><br>• If player has a matching domino, it must be played.<br><br>• If player does not have a domino in his/her hand that matches the dominoes already played, then he/she must pick one domino from the "Reserve Pile." If the domino picked can be played, he/she must play it. If not, the player adds the domino to his/her dominoes and the play goes to the next player in a clockwise direction.<br><br>• Play continues until one player has played all of his/her dominoes. See Diagram 1, which shows a possible continuous play of a game. |

Figure 9

OPPOSITES PICTURE MATCH GAME

EDUCATIONAL GOAL: To teach and reinforce vocabulary and the meaning of opposites.

OBJECTIVE: Each player competes to get the highest score.

SETUP
1. Players choose 2 cards from 8 sets of Picture Cards with corresponding pictures for matching opposites.

GAMEPLAY
1. Two Picture cards with a pool or deck of corresponding opposite pictures (face down) are viewed on the screen.

2. First player takes two pictures from the pool or deck to play on either of the two Picture Cards showing on the screen:

3. Player places his 2 pictures correctly on the opposite pictures on either of the Picture Cards.

4. If a "Sorry" card (a card with no picture on it) is drawn, player loses one chance to match an opposite picture on the Picture Cards. He then places the other picture correctly on either Picture Card. The "Sorry" card is put in a "discard pile."

5. If two "Sorry" cards are drawn, player loses his turn and play goes to the next player.

6. After a player places his pictures on the Picture Cards, the computer will calculate his total number of points for that turn:

•1 point for each picture matched with its opposite on the Picture Cards.
•0 points for the "Sorry" card.
•5 points when a picture matched completes all the matching of opposite pictures on a Picture Card.

7. Next player, and then each in turn, takes two pictures and continues in the same manner.

8. Ending the Game: The game ends when players finish matching all opposite pictures on the two Picture Cards. The player with the most points is the winner.

Figure 10a

MATCH AND MISSING LETTERS – FOUR LETTER LONG VOWEL WORDS

EDUCATIONAL GOAL: To teach and reinforce recognition and sounding out of four letter long vowel words.

OBJECTIVE: Each player competes to get the highest score.

SETUP
1. Players choose 2 cards from 8 sets of Picture/Word Cards to play.
2. Players determine which side of the Picture/Word Cards will be used for the game:
Side 1, showing all letters of each word to be matched, or Side 2, showing some letters of each word to be matched and there is one missing letter, a blank space that is to be filled in with the correct letter.
3. Go over Long Vowel Rule Chart so children will remember the sound each vowel makes.

GAMEPLAY

1. Two Picture/Word cards with a pool of corresponding letter tiles (face down) are viewed on the screen.
2. First player takes two tiles from the pool to play on either of the two Picture/Word Cards showing on the screen:
    •On the matching side of the Picture/Word cards, player places his 2 tiles correctly on the corresponding letters.
    •On the matching and filling in the missing letters side of the Picture/Word Cards, player places his tiles correctly on the corresponding letters and/or fills in the correct missing letters.
3. If a "Sorry" (a tile with no letter on it) is drawn, player loses one chance to match or fill in a letter. He then places the other tile correctly on the corresponding letter or fills in a blank of either Picture/Word card. The "Sorry" tile is put in a "discard pile."
4. If two "Sorry" tiles are drawn, player loses his turn and play goes to the next player.
5. After a player places his tiles on the Picture/Word cards, the computer will calculate his total number of points for that turn:
•1 point for each letter tile matched on the Picture/Word cards
•2 points for each letter tile filled in on a missing letter of the Picture/Word cards
•0 points for the "Sorry" tile
•5 points when a letter tile matched or filled in completes the spelling of the word (Computer will sound out each letter of the word and then says the word)
6. Next player, and then each in turn, takes two tiles and continues in the same manner.
7. Ending the Game: The game ends when players finish matching and/or filling in all letters on the two Picture/Word Cards. The player with the most points is the winner..

Figure 10b

MATCH AND MISSING LETTERS – FIVE LETTER LONG VOWEL WORDS
EDUCATIONAL GOAL: To teach and reinforce recognition and sounding out of five letter long vowel words.

OBJECTIVE: Each player competes to get the highest score.

SETUP
1. Players choose 2 cards from 8 sets of Picture/Word Cards to play.
2. Players determine which side of the Picture/Word Cards will be used for the game: Side 1, showing all letters of each word to be matched, or Side 2, showing some letters of each word to be matched and there is one missing letter, a blank space that is to be filled in with the correct letter.
3. Go over Long Vowel Rule Chart so children will remember the sound each vowel makes.

GAMEPLAY
1. Two Picture/Word cards with a pool of corresponding letter tiles (face down) are viewed on the screen.
2. First player takes two tiles from the pool to play on either of the two Picture/Word Cards showing on the screen:
•On the matching side of the Picture/Word cards, player places his 2 tiles correctly on the corresponding letters.
•On the matching and filling in the missing letters side of the Picture/Word Cards, player places his tiles correctly on the corresponding letters and/or fills in the correct missing letters.
3. If a "Sorry" (a tile with no letter on it) is drawn, player loses one chance to match or fill in a letter. He then places the other tile correctly on the corresponding letter or fills in a blank of either Picture/Word card. The "Sorry" tile is put in a "discard pile."
4. If two "Sorry" tiles are drawn, player loses his turn and play goes to the next player.
5. After a player places his tiles on the Picture/Word cards, the computer will calculate his total number of points for that turn:
•1 point for each letter tile matched on the Picture/Word cards
•2 points for each letter tile filled in on a missing letter of the Picture/Word cards
•0 points for the "Sorry" tile
•5 points when a letter tile matched or filled in completes the spelling of the word (Computer will sound out each letter of the word and then says the word)
6. Next player, and then each in turn, takes two tiles and continues in the same manner.
7. Ending the Game: The game ends when players finish matching and/or filling in all letters on the two Picture/Word Cards. The player with the most points is the winner.

Figure 11a

MATCH AND MISSING LETTERS – FOUR LETTER SHORT VOWEL WORDS

EDUCATIONAL GOAL: To teach and reinforce recognition and sounding out of four letter short vowel words.

OBJECTIVE: Each player competes to get the highest score.

SETUP
1. Players choose 2 cards from 8 sets of Picture/Word Cards to play.
2. Players determine which side of the Picture/Word Cards will be used for the game: Side 1, showing all letters of each word to be matched, or Side 2, showing some letters of each word to be matched and there is one missing letter, a blank space that is to be filled in with the correct letter.
3. Go over Vowel Chart so children will remember the sound each vowel makes.

GAMEPLAY
1. Two Picture/Word cards with a pool of corresponding letter tiles (face down) are viewed on the screen.
2. First player takes two tiles from the pool to play on either of the two Picture/Word Cards showing on the screen:
•On the matching side of the Picture/Word cards, player places his 2 tiles correctly on the corresponding letters.
•On the matching and filling in the missing letters side of the Picture/Word Cards, player places his tiles correctly on the corresponding letters and/or fills in the correct missing letters.
3. If a "Sorry" (a tile with no letter on it) is drawn, player loses one chance to match or fill in a letter. He then places the other tile correctly on the corresponding letter or fills in a blank of either Picture/Word card. The "Sorry" tile is put in a "discard pile."
4. If two "Sorry" tiles are drawn, player loses his turn and play goes to the next player.
5. After a player places his tiles on the Picture/Word cards, the computer will calculate his total number of points for that turn:
•1 point for each letter tile matched on the Picture/Word cards
•2 points for each letter tile filled in on a missing letter of the Picture/Word cards
•0 points for the "Sorry" tile
•5 points when a letter tile matched or filled in completes the spelling of the word (Computer will sound out each letter of the word and then says the word)
6. Next player, and then each in turn, takes two tiles and continues in the same manner.
7. Ending the Game: The game ends when players finish matching and/or filling in all letters on the two Picture/Word Cards. The player with the most points is the winner.

Figure 11b

MATCH AND MISSING LETTERS – FIVE LETTER SHORT VOWEL WORDS

EDUCATIONAL GOAL: To teach and reinforce recognition and sounding out of five letter short vowel words.

OBJECTIVE: Each player competes to get the highest score.

SETUP
1. Players choose 2 cards from 8 sets of Picture/Word Cards to play.
2. Players determine which side of the Picture/Word Cards will be used for the game:
Side 1, showing all letters of each word to be matched, or Side 2, showing some letters of each word to be matched and there is one missing letter, a blank space that is to be filled in with the correct letter.
3. Go over Vowel Chart so children will remember the sound each vowel makes.

GAMEPLAY
1. Two Picture/Word cards with a pool of corresponding letter tiles (face down) are viewed on the screen.
2. First player takes two tiles from the pool to play on either of the two Picture/Word Cards showing on the screen:
- On the matching side of the Picture/Word cards, player places his 2 tiles correctly on the corresponding letters.
- On the matching and filling in the missing letters side of the Picture/Word Cards, player places his tiles correctly on the corresponding letters and/or fills in the correct missing letters.
3. If a "Sorry" (a tile with no letter on it) is drawn, player loses one chance to match or fill in a letter. He then places the other tile correctly on the corresponding letter or fills in a blank of either Picture/Word card. The "Sorry" tile is put in a "discard pile."
4. If two "Sorry" tiles are drawn, player loses his turn and play goes to the next player.
5. After a player places his tiles on the Picture/Word cards, the computer will calculate his total number of points for that turn:
- 1 point for each letter tile matched on the Picture/Word cards
- 2 points for each letter tile filled in on a missing letter of the Picture/Word cards
- 0 points for the "Sorry" tile
- 5 points when a letter tile matched or filled in completes the spelling of the word
(Computer will sound out each letter of the word and then says the word)
6. Next player, and then each in turn, takes two tiles and continues in the same manner.
7. Ending the Game: The game ends when players finish matching and/or filling in all letters on the two Picture/Word Cards. The player with the most points is the winner.

Figure 12

WHAT DO YOU HEAR?

EDUCATIONAL GOALS: To teach and reinforce letter recognition, letter sounds and initial sounds of pictures. This game develops fine motor skills by using small muscles in the hands, strengthens eye-hand coordination, encourages interaction between adult and child, and gives adults an opportunity to praise a child when something is done correctly.

Playing in real time also enhances the child's expressive language, builds self-esteem, and accomplishes these goals simply by HAVING FUN playing games with family and friends.

OBJECTIVE: To cover the most pictures with your color chips.

GAMEPLAY:
1. First player rolls the dice.
2. The three letters rolled will be named and the sounds they make will be given by the computer.
- Player then covers those three pictures on the game board by dragging and releasing his color chips with his finger to the correct three pictures that correspond with the sound the letters make.
- Computer will name the picture and the beginning sound when a player covers the correct picture.
- The player will choose three pictures, correct or incorrect, per turn.
- If player chooses an incorrect picture, the computer will say "Incorrect Picture." The computer will also say, "If you hurry and the timer does not run out, you can move your chip to another picture."
- If a letter rolled has the corresponding picture already covered with a chip, the computer will say, "Letter name picture is taken." Example: "B picture is taken."
- The Happy Face on the dice is wild and can be used to cover any uncovered picture.
3. The next player, and then each in turn, rolls the dice and continues in the same manner.
4. Ending the Game: Continue until all the pictures are covered.
The player who has the most pictures covered with his color chips is the winner.

Suggestion: Help may be given to identify the letters and the sounds they make.

Figure 13a

ADDITION AND SUBTRACTION WITH PEGS

Addition
Contents:
•Unlimited pool of pegs in four colors.
•Three levels of play:
- 0-9 dice for Easy
- 0-12 dice for Medium
- 0-18 dice for Hard

•A timer is needed. 60 seconds for all levels of play.
•Selection of Three to Six Turns per game.

Gameplay
•Players roll dice for the level they have chosen.
•The number fact will be shown in the yellow message bar as: 6+12=, and a recorded voice will also say 6+12=
•The player will tap in the answer on a calculator-type graphic.
Example: the answer is 18, so the player will tap the 1 and 8 and hit Enter for the answer 18.
The computer will send 18 pegs from the pool into the player's circle/box.
•If the player enters a lower or higher number than the correct answer, the pegs will not come down from the pool to the player's box. A recorded voice will say: "Your answer is not correct. If you hurry and the timer does not run out, you can change your answer." If the player enters the correct number for the answer, the pegs will then go into the player's box from the pool.
•If the player does not enter the correct answer before the timer runs out a recorded voice will say, "Sorry, your time has run out. Better luck next time." The play goes to the next player.
•At each player's turn the number of pegs will be displayed in his player's box. There will be a running total of all pegs brought to the player's box from the pool until the number of turns for the game has been reached.
•Ending of the Game: The game ends when each player has had the number of turns for the game as decided in the beginning of the game.
•The Winner is the player with most number of pegs in his player's box.
• Tie Breaker. As simple as rolling the dice used in the game to see who gets the highest sum of the number fact to be the winner of the game.

Figure 13b

Subtraction:
Contents
•Pegs in four colors in the player's box.
•Three levels of play:
a. 0-9 dice for easy & 54 pegs in each player's box (with the number 54 displayed in the middle of the player's box)
b. 0-12 dice for med. & 72 pegs in each player's box (with the number 72 displayed in the middle of the player's box)
c. 0-18 dice for hard & 108 pegs in each player's box (with the number 108 displayed in the middle of the player's box)
•A timer is needed. 60 seconds for all levels of play.
4.Four Players' Boxes : the total of pegs for each player will be displayed in the middle of the player's box:
        •Easy level: each player has 54 displayed in the middle of the player's box.
        •Med level: each player has 72 displayed in the middle of the player's box.
        •Hard level: each player has 108 displayed in the middle of the player's box.

5.Selection of Three to Six Turns per game.

Figure 13c

Gameplay:
- Players roll dice for the level they have chosen.
- The number fact will be shown in the yellow message bar as: 18-6=, and a recorded voice will also say 18-6=
- The player will tap in the answer on a calculator-type graphic.
- Example: the answer is 12, so the player will tap the 1 and 2 and hit Enter for the answer 12.
- The computer will send 12 pegs from the player's circle/box into the pool.
- If the player enters a lower or higher number than the correct answer, the pegs will not leave the player's box to go to the pool. A recorded voice will say: "Your answer is not correct. If you hurry and the timer does not run out, you can change your answer." If the player enters the correct number for the answer, the pegs will then go from the player's box to the pool.
- If the player does not enter the correct answer before the timer runs out a recorded voice will say, "Sorry, your time has run out. Better luck next time." The play goes to the next player.
- At each player's turn the number of pegs removed from his player's box will be subtracted from the number displayed in the middle of his player's box. There will be a running difference of all pegs taken from the player's box and brought to the pool until the number of turns for the game has been reached.
- Players must get the exact number needed to put their pegs into the pool. Example: A player has a number fact with the answer 4 and he only has 3 pegs left in his player's box. A recorded voice will say, "Sorry, you do not have enough pegs. Better Luck on your next turn." The player will lose this one turn and the play will go to the next player. The player that lost his turn will try again on his next turn.
- Ending of the Game: The game ends when a player has no pegs remaining in his player's box or when each player has had the number of turns for the game as decided in the beginning of the game.
- The Winner is the player with least number of pegs in his player's box.
- Tie Breaker. As simple as rolling the dice used in the game to see who gets the lowest difference of the number fact to be the winner of the game.

Figure 14a

GIVE AND TAKE

EDUCATIONAL GOALS: To reinforce coin recognition, learn names and values of coins, and learn to count money.

AGES: 4 TO 8+

NUMBER OF PLAYERS: 2 to 4

OBJECTIVE: To be the player with the highest amount of money.

CONTENTS: A Spinner, pictures of coins front and back: nickels, dimes, quarters, 60 pennies, a Picture Chart of coins.

OBJECTIVE: Each player competes for the highest amount of money.

SETUP
There is a pool of coins. Review Picture Chart and discuss names and values of coins. Each player has two dollars as his own money: five quarters, four dimes, five nickels, ten pennies that are placed in each player's box.

GAMEPLAY
• The first player spins the spinner, and the computer will announce the amount pointed to by the arrow. "Take" means player takes the amount of money shown on spinner from the pool and puts that amount to his own pile of money. "Give" means player puts into the pool the amount of money shown on the spinner.
• Each player in turn continues playing in the same manner until each player has had six turns to spin the spinner.
• If a player gives the last of his money from his pile. The player does not have to spin the exact amount. Example: The player spins "Give 45 cents," and there is only 30 cents left of his own money. The player will put in the 30 cents of his money. Or players must get the exact amount needed to put their coins into the pool. Example: A player has an amount of "Give 26 cents" and he only has 24 cents left in his player's box. A recorded voice will say, "Sorry, you do not have enough coins. Better Luck on your next turn." The player will lose this one turn and the play will go to the next player. The player that lost his turn will try again on his next turn.
• If a player needs smaller coins to play during the game, the player can exchange his equal value coins for different coins from the pool.
• Ending the Game: The game is over when each player has had the number of turns chosen at the beginning of the game to spin the spinner as a full game or when a player loses all his own money. The player that has the largest amount of money at the end of the game is the winner.
Use the chart provided whenever needed.

Figure 14b

MONEY POEM ONE:
Penny, nickel, dime and quarter.
I can put them in some order.
Pennies are brown.
Nickels are fat.
Dimes are thin,
How about that!
The biggest is the quarter,
    See, I'm a good sorter.

MONEY POEM TWO:
I have a game that may sound funny
Let's count, and count, and count our money.
The penny is one.
But we're not done.
The nickel is five.
It rhymes with hive.
The dime is ten.
Keep counting, then.
The last is the quarter, which has twenty-five.
We've played our game, so here's a High Five!

Figure 15

LUCKY LETTERS DICE GAME – CAPITAL LETTERS

EDUCATIONAL GOAL: To teach and reinforce recognition of capital letters.
This game develops fine motor skills by using small muscles in the hands, strengthens eye-hand coordination, allows interaction between adult and child which encourages family unity and creates wonderful memories, and gives adults an opportunity to praise a child when something is done correctly.
Playing in real time also enhances the child's expressive language, builds self-esteem, and accomplishes these goals simply by HAVING FUN playing games with family and friends.

OBJECTIVE: To be the player to cover the most letters with his chips.

GAMEPLAY:
1. Player rolls dice to get three letters.
2. The three letters rolled will be named by voice.
•Player then covers those three letters by dragging and releasing his chip with his finger onto the correct letters on the game board.
•The Happy Face on the dice is wild and can be used to cover any letter that is not already covered with a chip.
•If the player chooses the incorrect letter his chip will not stay on the game board, and the computer will say, "If you hurry and the timer does not run out, you can move your chip to another letter."
•If any letters rolled are already covered with a chip, a voice will say the name of the letter and then say, "is covered." Example: "t is covered."
3. Each player, in turn, rolls the dice and continues in the same manner.
4. Ending the Game: Continue until all letters are covered.
The player who has the most letters covered with his chips is the winner.

Suggestion: Help may be given to identify the letters.

Figure 16

MATCH AND MISSING LETTERS – THREE LETTER WORDS

EDUCATIONAL GOAL: To recognize and sound out three letter short vowel words. This game develops fine motor skills by using small muscles in the hands, strengthens eye-hand coordination, allows interaction between adult and child which encourages family unity and creates wonderful memories, and gives adults an opportunity to praise a child when something is done correctly. Playing in real time also enhances the child's expressive language, builds self-esteem, and accomplishes these goals simply by HAVING FUN playing games with family and friends.

OBJECTIVE: Each player competes to get the highest score.

SETUP
1. Players choose 2 cards from 8 sets of Picture/Word Cards to play.
2. Players determine which side of the Picture/Word Cards will be used for the game:
•Side 1: showing all letters of each word to be matched and player places his 2 tiles correctly on the corresponding letters.
•Side 2: showing some letters of each word to be matched and there is one missing letter, a blank space that is to be filled in with the correct letter. Player places his tiles correctly on the corresponding letters and/or fills in the correct missing letters.
3. Go over Vowel Chart so children will remember the sound each vowel makes.

GAMEPLAY
1. Two Picture/Word cards with a pool of corresponding letter tiles (face down) are viewed on the screen.
2. Each player in turn takes two tiles from the pool and correctly places them on either of the two Picture/Word Cards viewed on the screen:,
3. If a "Sorry" (a tile with no letter on it) is drawn, player loses one chance to match or fill in a letter and places the other tile correctly on the corresponding letter or fills in a blank of either Picture/Word card. The "Sorry" tile is put in a "discard pile."
4. If two "Sorry" tiles are drawn, player loses his turn and play goes to the next player.
5. After a player places his tiles on the Picture/Word cards, the computer will calculate his total number of points for that turn:
•1 point for each letter tile matched correctly on the Picture/Word cards
•2 points for each letter tile filled in correctly on a missing letter of the Picture/Word cards
•0 points for tile placed incorrectly
•0 points for the "Sorry" tile
•5 points when a letter tile matched or filled in completes the spelling of the word (Computer will sound out each letter of the word and then says the word)
6. Next player, and then each in turn, takes two tiles and continues in the same manner.
7. Ending the Game: The game ends when players finish matching and/or filling in all letters on the two Picture/Word Cards. The player with the most points is the winner.

Figure 17a

ROLL'EM – THREE GAMES IN ONE

EDUCATIONAL GOAL: To teach and reinforce number recognition and adding numbers. This game develops fine motor skills by using small muscles in the hands, strengthens eye-hand coordination, encourages interaction between adult and child, and gives adults an opportunity to praise a child when something is done correctly.
Playing in real time also enhances the child's expressive language, builds self-esteem, and accomplishes these goals simply by HAVING FUN playing games with family and friends.

OBJECTIVE: Each player competes to get the highest score.

GAME ONE: RED DICE FOR NUMBER RECOGNITION ONLY (1 to 6 on one dice and 4 to 9 on the other dice):
1. First player rolls dice.
2. Player will touch the green numbers on Number Sign that correspond with the numbers rolled on the dice so the red numbers will now be displayed. Example: 4 and 7 are rolled on the dice. Player will touch the 4 and 7 green numbers on the Number Sign and the red 4 and 7 will be displayed.
3. The same player continues his turn to play as long as one of the numbers of the dice rolled corresponds to the green numbers on the Number Sign.
4. If neither of the numbers rolled on the dice correspond with any green numbers remaining on the Number Sign, this is the end of the first player's turn.
5. The total of red numbers showing on the Number Sign is his score for the game.
6. The second player, and then each in turn, repeats the process above.
7. Repeat process until all players have had a turn.
Ending of Game: Player with the highest score after all players have had a turn wins the game.
    8. Tie Score: The tying players play again. Whoever gets the first highest score in an equal number of turns is the winner.

Figure 17b

GAME TWO: WHITE DICE FOR NUMBER RECOGNITION AND ADDITION (1 to 6 on both dice):
1. Play as above except player touches the green numbers to correspond to the numbers on the dice or any one, two or three green numbers that are the sum of the numbers rolled on the dice.
•Example: 6 and 2 are rolled on the dice. The player can touch the green numbers 6 and 2, 8, or any two numbers that will add up to 8, such as: (7 and 1), (5 and 3), or any three numbers that will add up to 8, such as: (1, 3 and 4), (1, 2 and 5), provided the numbers needed are green on the Number Sign.
2. The first player continues his turn to play as long as both of the numbers of the dice rolled corresponds or is the sum of any green numbers remaining on the Number Sign.
3. The total of red numbers showing on the Number Sign is his score for the game.
4. The second player, and then each in turn, repeats the process above.
5. Repeat process until all players have had a turn.
Ending of Game: Player with the highest score after all players have had a turn wins the game.

Figure 17c

GAME THREE: YELLOW DICE FOR NUMBER RECOGNITION AND ADDITION WITH HELP (1 to 6 with corresponding stars next to the numbers on both dice):
1. Play the same as White Dice except help child with addition as follows, tell him to take the largest number and then look at the little stars next to lowest number die and count from the larger number.
•Example: The numbers rolled are 6 and 2 or 6 + 2 = 8. The largest number is 6. Then pointing at each star on the lowest number dice (2), count 6...7,8. 6 + 2 = 8.
•Another Example: The numbers rolled are 5 and 4 or 5 + 4 = 9. The largest number is 5. Then pointing at each star on the lowest number dice (4), count 5....6,7,8,9. 5 + 4 = 9.
2. Children can count the stars next to the green numbers on the Number Sign to get the sum of 3 different numbers when necessary.
•Example: The numbers rolled are 5 and 6 or 5 + 6 = 11. When using 3 numbers to make the sum of 11, you can touch the numbers (3,2, and 6); (4,2, and 5); or (4,1, and 6). Take the largest number of the three numbers and then pointing and counting each star next to the lower numbers will help children get the correct sum.
3. The total of red numbers showing on the Number Sign is his score for the game.
4. The second player, and then each in turn, repeats the process above.
5. Repeat process until all players have had a turn.
 Ending of Game: Player with the highest score after all players have had a turn wins the game.

Figure 18

SPIN FOR NUMBERS 0 - 25

EDUCATIONAL GOAL: To teach and reinforce number recognition and sequence of numbers 0 to 25.

This game develops fine motor skills by using small muscles in the hands, strengthens eye-hand coordination, allows interaction between adult and child which encourages family unity and creates wonderful memories, and gives adults an opportunity to praise a child when something is done correctly.

Playing in real time also enhances the child's expressive language, builds self-esteem, and accomplishes these goals simply by HAVING FUN playing games with family and friends.

AGES: 4 to 7

OBJECTIVE: To cover the most numbers with your color chips.

GAMEPLAY:
1. First player rotates the spinner by pushing the button in the middle of the Spinner.
2. The two numbers that are pointed to on both sides of the spinner arrow will be named by the computer.
3. Player then covers those two numbers with the matching blue numbers around the spinner by dragging and releasing his color chips with his finger to the correct numbers.
4. The Happy Face on the spinner is wild and can be used to play any number that is not already covered with a chip.
5. If any number that a player spins is already covered with a chip, computer will say the name of the number and then say "is covered." Example: "24 is covered."
6. If the player chooses the incorrect letter his chip will not stay on the game board, and the computer will say, "If you hurry and the timer does not run out, you can move your chip to another number."
7. Next player rotates the spinner and continues in the same manner.
8. Ending the Game: Continue until all the numbers are covered.

The player who has the most numbers covered with his color chips is the winner.
Suggestion: Help may be given to identify the numbers.

Figure 19

ABC RECALL – CAPITAL LETTERS

EDUCATIONAL GOAL: To teach and reinforce recognition of capital letters.
This game develops fine motor skills by using small muscles in the hands, strengthens eye-hand coordination, allows interaction between adult and child which encourages family unity and creates wonderful memories, and gives adults an opportunity to praise a child when something is done correctly.

Playing in real time also enhances the child's expressive language, builds self-esteem, and accomplishes these goals simply by HAVING FUN playing games with family and friends.

AGES: 3 to 7

NUMBER OF PLAYERS: 2 to 4 players

OBJECTIVE: To collect the most matched sets of two.

SETUP
Five groups containing two of each letter as follows:
•Group 1 – A through F
•Group 2 – G through L
•Group 3 – M through R
•Group 4 – S through X
•Group 5 – Y, Z, M, N, G, and Q GAMEPLAY
•On each turn, a player chooses two pictures (one at a time). If the letters match, the player receives one point and takes another turn. The computer will keep a running total of points for each player on their turn, and it will be shown in the player's box.
•If the player gets another match he gets another turn until he does not make a match before it goes to the next player.
•When a player chooses two pictures that are not matching letters, it becomes the next player's turn.
•Ending of Game: Continue play in the same manner until all letters are matched. The winner is the player with the most points.

Variations: 18, 24, and 36 pictures to a game.

Figure 20a

HIGHEST COUNT

EDUCATIONAL GOAL: To teach and reinforce recognition, value and counting of coins. This game promotes positive relationships between parents and children, and gives adults an opportunity to praise a child when something is done correctly. Playing in Real Time encourages family unity, builds self-esteem, creates wonderful memories and accomplishes these goals simply by HAVING FUN playing games with family and friends.

OBJECTIVE: To accumulate the most money at the end of the game.

GAMEPLAY:

1. Parent or player reads aloud the two money poems found at the end of the directions. These poems will help players recognize coins easily and to remember the value of each coin.
2. The first player rolls the dice. The computer will identify the pictures of each coin on the dice.
3. Player takes the coins pictured on the dice from the beach rafts. Example: The nickel, dime and quarter are rolled. The player takes one nickel, one dime and one quarter from the rafts by dragging and releasing the coins with his finger to start a pile of coins in front of him.
• The player will choose three coins, correct or incorrect, per turn.
• The computer will name the coin when the player takes the correct coin from the beach raft.
• If player takes an incorrect coin the computer will say, "Incorrect Coin."
4. The next player, and then each in turn, rolls the dice and continues in the same manner.
5. Ending the Game: The game ends after each player has 6 turns to roll the dice.
6. Through visual demonstration the computer will count the amount of money each player has accumulated.
7. The player with the most amount of money wins the game. In case of a tie, the two players will take an additional roll of the dice to get a higher amount of money.

Figure 20b

MONEY POEM ONE:
Penny, nickel, dime and quarter.
I can put them in some order.
Pennies are brown.
Nickels are fat.
Dimes are thin,
How about that!
The biggest is the quarter,
See, I'm a good sorter.

MONEY POEM TWO:
I have a game that may sound funny
Let's count, and count, and count our money.
The penny is one.
But we're not done.
The nickel is five.
It rhymes with hive.
The dime is ten.
Keep counting, then.
The last is the quarter, which has twenty-five.
We've played our game, so here's a High Five!

Figure 21  WORD RECALL – SIGHT VOCABULARY WORDS

EDUCATIONAL GOAL: To teach and reinforce recognition of sight words.
This game develops fine motor skills by using small muscles in the hands, strengthens eye-hand coordination, allows interaction between adult and child which encourages family unity and creates wonderful memories, and gives adults an opportunity to praise a child when something is done correctly.

Playing in real time also enhances the child's expressive language, builds self-esteem, and accomplishes these goals simply by HAVING FUN playing games with family and friends.

AGES: 3 to 7

NUMBER OF PLAYERS: 2 to 4 players

OBJECTIVE: To collect the most matched sets of two.

SETUP
Five groups of two sets of six sight words.

GAMEPLAY
•On each turn, a player chooses two pictures (one at a time). If the words match, the player receives one point and takes another turn. The computer will keep a running total of points for each player on their turn, and it will be shown in the player's box.
•If the player gets another match he gets another turn until he does not make a match before it goes to the next player.
•When a player chooses two pictures that are not matching words, it becomes the next player's turn.
•Ending of Game: Continue play in the same manner until all words are matched. The winner is the player with the most points.
Variations: 18, 24, and 36 pictures to a game.

Figure 22a

WORD PUZZLES SIGHT VOCABULARY WORDS

EDUCATIONAL GOAL: To teach and reinforce recognition of sight words.
This game develops fine motor skills by using small muscles in the hands, strengthens eye-hand coordination, promotes positive relationships between parents and children, and gives adults an opportunity to praise a child when something is done correctly. Playing in Real Time encourages family unity, enhances a child's expressive language, builds self-esteem, creates wonderful memories and accomplishes these goals simply by HAVING FUN playing games with family and friends.

CONTENTS: Word cards for each vowel, tiles, four tile racks,

OBJECTIVE: Each player competes to get the highest score.

SETUP
Mix Word Cards and place them facedown in a pile. Place all letter tiles facedown in the middle of the table and mix them up. All players draw eight new letters each and place them in their racks, and take one Word Card from the pile. Maximum number of turns per game is six.

GAMEPLAY
1. The first player matches his tiles to the red letters on his Word Card. Black letters on Word Cards remain unmatched. He then draws as many new letters as he played, always keeping eight letters on his rack, as long as there are enough left on the table.
2. Play passes to the left. The second player, and then each in turn, continues in the same manner, matching their tiles to the red letters on their Word Card and drawing as many new letters as were played.
3. If you have no tiles to match your Word Card you will exchange all of your letters. To do this, place your discarded letters facedown in front of you. Draw eight new letters from the pool, then mix your discarded letters into the pool. This ends your turn.
4. On the sixth turn do not replace tiles that were played. Also on the sixth turn, if no tiles can be matched, player receives no points and his tiles remain in his rack.
5. Ending the Game: The game ends when all letters have been drawn, each player has had six turns or someone has matched all the red letters on their card.

Figure 22b

SCORING

•5 points are given for each completely matched word, except for the vowels.
•1 point is given for each letter matched in an incomplete word.
The player with the highest score is the winner. In case of a tie, the players deduct one point for each un-played letter in their rack.

Figure 23

SPIN FOR WORDS - SIGHT VOCABULARY WORDS

EDUCATIONAL GOAL: To teach and reinforce word recognition.
This game develops fine motor skills by using small muscles in the hands, strengthens eye-hand coordination, allows interaction between adult and child which encourages family unity and creates wonderful memories, and gives adults an opportunity to praise a child when something is done correctly.
Playing in real time also enhances the child's expressive language, builds self-esteem, and accomplishes these goals simply by HAVING FUN playing games with family and friends.

AGES:    4 to 8

OBJECTIVE: To cover the most words with your color chips.

GAMEPLAY

1. First player rotates the spinner by pushing the button in the middle of the Spinner.
2. The two words that are pointed to on both sides of the spinner arrow will be named by the computer.
3. Player then covers those two words with the matching words on the board by dragging and releasing his color chips with his finger to the correct words.
4. The Happy Face on the spinner is wild and can be used to play any word that is not already covered with a chip.
5. If any word that a player spins is already covered with a chip, computer will say the name of the word and then say "is covered." Example: "Cat is covered."
6. If the player chooses the incorrect word his chip will not stay on the game board , and the computer will say, "If you hurry and the timer does not run out, you can move your chip to another number."
7. Next player rotates the spinner and continues in the same manner.
8. Ending the Game: Continue until all the words are covered.
The player who has the most words covered with his color chips is the winner.
Suggestion: Help may be given to identify and sound out words.

Figure 24a

FISHING FOR WORDS SIGHT VOCABULARY

EDUCATIONAL GOAL: To teach and reinforce recognition of sight words.

This game develops fine motor skills by using small muscles in the hands, strengthens eye-hand coordination, allows interaction between adult and child which encourages family unity and creates wonderful memories, and gives adults an opportunity to praise a child when something is done correctly.

Playing in real time also enhances the child's expressive language, builds self-esteem, and accomplishes these goals simply by HAVING FUN playing games with family and friends.

AGES: 3 to 6

OBJECTIVE: To be the player with the most highest score.

SETUP
- There will be several sets of 24 words each that the player will use to play in the game.
- There will be a number of "Sorry" fish that have no points when caught.
- The players will also decide how many turns each player will have for a full game. The players can choose 3 to 6 turns for each player as a full game.

Figure 24b

GAMEPLAY

- First player using the mouse to click on the fish with a word that is swimming by. The fish will turn over so the word is seen and the computer will announce the word name and sound out the word. Each word caught receives 1 point.
- If a "Sorry" fish is caught, the player receives 0 points. The computer will keep a running score for each player at the end of the player's turn.
- Next player, and then each in turn, catches a fish and continues in the same manner.
- Ending the Game: The game ends at the finish of the number of turns that was chosen at the beginning of the game. The player with the most points is the winner.
- Scoring: Fish with a word – 1 point
  Fish that has "Sorry" – 0 points
- If there is a tie, those players have another turn to break the tie by rolling dice.

Figure 25a

Match And Missing Letters -- Sight Vocabulary Words

EDUCATIONAL GOAL: The Educational Goal of this game is to teach and reinforce recognition of sight vocabulary words. This game develops fine motor skills by using small muscles in the hands, strengthens eye-hand coordination, allows interaction between adult and child which encourages family unity and creates wonderful memories, and gives adults an opportunity to praise a child when something is done correctly.

OBJECTIVE: Each player competes to get the highest score.

SETUP: 1. Players choose 2 cards from 8 sets of Word Cards to play; 2. Players determine which side of the Word Cards will be used for the game: Side 1, showing all letters of each word to be matched, or Side 2, showing some letters of each word to be matched and there is one missing letter, a blank space that is to be filled in with the correct letter.

Figure 25b

GAME PLAY:

1. Two Word cards with a pool of corresponding letter tiles (face down) are viewed on the screen.
2. First player takes two tiles from the pool to play on either of the two Word Cards showing on the screen:
a. On the matching side of the Word cards, player places his 2 tiles correctly on the corresponding letters;
b. On the matching and filling in the missing letters side of the Word Cards, player places his tiles correctly on the corresponding letters and/or fills in the correct missing letters.
3. If a "Sorry" (a tile with no letter on it) is drawn, player loses one chance to match or fill in a letter. He then places the other tile correctly on the corresponding letter or fills in a blank of either Word card. The "Sorry" tile is put in a "discard pile."
4. If two "Sorry" tiles are drawn, player loses his turn and play goes to the next player.
5. After a player places his tiles on the Word cards, the computer will calculate his total number of points for that turn: 1 point for each letter tile matched on the Word cards; 2 points for each letter tile filled in on a missing letter of the Word cards; 0 points for the "Sorry" tile; 5 points when a letter tile matched or filled in completes the spelling of the word (Computer will sound out each letter of the word and then says the word).
6. Next player, and then each in turn, take two tiles and continue in the same manner.

Ending the Game: The game ends when players finish matching and/or filling in all letters on the two Word Cards. The player with the most points is the winner.

LEARNING GAME PLATFORM, SYSTEM AND METHOD FOR AN ELECTRONIC DEVICE

CROSS-REFERENCE TO RELATED APPLICATIONS

This application is a divisional of applicant's co-pending U.S. patent application Ser. No. 14/545,290 filed Apr. 17, 2015 entitled "Learning Game Platform, System and Method for an Electronic Device", the disclosure of which is hereby incorporated in its entirety by reference thereto.

FIELD OF THE INVENTION

The present invention discloses electronic games; and more particularly to a platform supporting a system and method for digitizing, processing and transmitting educational games to an electronic device to facilitate learning.

DESCRIPTION OF RELATED ART

The best way children learn, and by far the easiest, is when they are enjoying themselves, having fun simply listening, seeing and repeating information offered in various ways. Children need every advantage to help them succeed in school. Electronic games provide a method for children to learn. These game formats have gained increased usage as educational tools.

Some examples of educational games can be found below:

U.S. Pat. No. 5,242,171 to Hata discloses a set of game cards including a plurality of first cards respectively indicating each number from 1 to 9, and a plurality of second cards each indicating a figure generated by multiplying together figures, respectively indicated on arbitrary first cards. Thus, the game cards help players learn multiplication tables when they are used.

U.S. Pat. No. 5,310,347 to Brand discloses a card game to facilitate the learning of spelling words. The card game is comprised of a number deck and a word deck. Players play the numbered cards and are then commanded to spell a word from a card from the word deck having a length equal to the additive sum of the numbered playing cards played.

U.S. Pat. No. 5,556,283 to Stendardo, et al. discloses an electronic learning system that utilizes a plurality of coded cards on which sensory-information representations are provided to present pictorial-symbol information and/or language-symbol information, in conjunction with a housing that contains card slots in combination with a visually and functionally distinctive button. The button is associated with each individual card slot and another button is associated in an equal manner to all card slots, so that a card may be inserted in each of the card slots. The operator can cause the system to generate unique audible information associated with the sensory-information representation provided on any selected card by pressing the visually and functionally distinctive button associated with the card slot in which the card is inserted. The operator can also cause the system to generate, automatically and sequentially, unique audible information associated with the sensory-information representation provided on each inserted card and, depending on the type of cards installed, perform secondary functions as the individual cards are being accessed. Secondary functions such as mathematical computations, pattern recognition, and spelling accuracy are performed by pressing the visually and functionally distinctive button associated in an equal manner with all card slots. Thereafter automatic tertiary functions take place such as the accuracy of the result of mathematical computations. These tertiary functions are accessed and an audible message is generated; an audible message equivalent to the combination of the installed cards is generated; and the accuracy of the spelling of words formed by individual cards is determined and indicated by generation of an audible message.

U.S. Pat. No. 5,827,071 to Sorensen, et al. discloses a method, computer program product, and system for teaching reinforcing concepts, principals, and other learned information without requiring user initiation of a learning sequence. Learning or reinforcement occurs by presenting "learning frames" in the environment automatically without requiring user initiation of the learning sequence. The user of the environment receives these intrusive or non-intrusive opportunities for learning while doing other tasks within the environment and may be interrupted from the task at hand and be required to respond to the presented learning frame or may simply have the opportunity for learning without requiring interruption of the task at hand according to the implementation of the present invention. In this manner, learning occurs as a by-product of other useful work, play, or other interaction with the environment and does not require dedicated user time and overt effort.

U.S. Pat. No. 6,077,080 to Rai discloses an education method for aiding to teach and learn proper English reading, sounding and spelling. The method is designed in being able to teach and to learn reading with the proper sounding of the English alphabet rapidly with minimal instruction and supervision. It employs colors and symbols to represent 18 vowel sounds, 30 consonant, phonogram sounds and silent sounds. Each colored alphabet letter, with or without symbol, maps a designated sound which helps to depict a correct sounding from various spelled combinations of the English language. This color and symbol mapping method facilitates teaching reading of the English words as well as to spell correctly. It reduces long intensive phonic drills as well as guessing mistakes from a various possible sounding.

U.S. Pat. No. 6,234,486 to Wallice discloses a word-forming card game that does not feature points comprising a deck of cards marked with letters of the alphabet and method of play. Players are dealt seven cards which they hold "hand" style and keep private throughout the game. Each player, in turn, has the opportunity to change the cards in his or her hand by picking a new card from a discard pile or the un-dealt stack of cards. If player keeps such new card he or she tosses a card from the existing hand to a discard pile in order to maintain a seven-card hand throughout the game. Players try to develop a hand in which every letter is either a word itself or part of a word. A seven-letter word wins and all other hands that use up all letters in combination of complete words are ranked based on longest word or words.

U.S. Pat. No. 6,276,940 to White discloses a card game for teaching children the alphabet. The game utilizes a deck of one hundred eighteen cards, each card being associated with a single letter of the alphabet that is displayed on one side of the card. The frequency of cards containing each letter is roughly the same as the frequency with which each letter occurs in the English language. There are more cards containing letters which are more frequently used and less cards containing letters which are less frequently used. A desired graphic design may be placed on the reverse side of each card. Scoring involves only simple addition, which is educational in itself. Points are earned by players as they form sets, runs, and words with the cards initially dealt to them or subsequently drawn from a draw pile or discard pile and held in a hand. Bonus words can be specified at the beginning of play to provide additional scoring incentive.

U.S. Pat. No. 6,447,300 to Greenberg discloses an educational game which is fun, appealing, and effective to readily teach children arithmetic. The child-friendly educational game can include a set of playing cards. Each card can have a different graphical representation of one or more Arabic numerals corresponding to a number and can also have a word corresponding to another number. In order to further teach children words associated with numbers, each card has a graphical representation of a hand with pointed fingers. The number of pointed fingers corresponds to the numerical value of the word appearing on the playing card.

U.S. Pat. No. 6,579,100 to Clark discloses a learning system method for infants, toddlers and young children which uses selected visuals stored on an audiovisual storage and playback device in conjunction with unique flash cards to provide an enhanced learning experience.

U.S. Pat. No. 6,910,893 to Dillhoff discloses a card game for learning which entails competitive play between players. As the game proceeds, the winner of a match must recite out loud the facts of learning printed on the playing cards. The game repetitively exposes the players to facts in a given subject area such as math, history, science, geography, literature, etc. The learning experience may be geared to different age brackets by tailoring the subject facts to different age brackets. Audible and visual cues help players to associate information for memory retention. Different decks for different age brackets and subjects are provided.

U.S. Patent App. Pub. No. 2004/0087363 to Bogenn discloses a digital video game strategy guide for learning to play a selected video game. The strategy guide includes a completed video game result, helpful comments with respect to strategy for playing the video game, and a menu for accessing different sections of the digital video game strategy guide.

U.S. Patent App. Pub. No. 2007/0167234 to Liu discloses a method to play a multiplayer online game. The method provides a handset and a multiplayer game stored on a server, where that server comprises (N) user profiles including the (i)th user profile comprising the (i)th game status and the (i)th digital signature assigned to the (i)th user, wherein the (i)th user is one of the (N) users. The method establishes a communication link between the handset and the server, such that the (i)th user can play the multiplayer game, using the handset and the (i)th game status, with one or more other users in communication with the server. The method downloads to the handset the game software and the (i)th user profile comprising the (i)th game status and the (i)th digital signature, before discontinuing the communication link between the handset and the server.

U.S. Patent App. Pub. No. 2008/0070682 to Woody discloses systems and methods that enable young children (e.g., toddlers to pre-kindergarten aged children) and/or persons with disabilities to easily play, and effectively learn from, interactive, educational, and entertaining games. The edutainment game may be a series of instructions stored on a digital storage medium for use with a game system. The young child or person with a disability may play the game using a wireless, handheld controller that is easily graspable, maneuverable, and manipulatable, and the young child or person with a disability may play the game alone or with supervision from another person. The edutainment games may include one or more learning tools (or learning games), emphasizing skills such as, for example, color, shape, and/or sound recognition; puzzle-solving; navigation; number recognition, counting, and/or ordering; alphabet and reading/writing; etc. These skills may be emphasized individually or in various combinations.

U.S. Patent App. Pub. No. 2009/0017913 to Bell, et al. discloses a gaming platform that may support massively-multiplayer online computer games, with elements of social networking, in which players may use mobile devices in order to verify their location and claim a measure of control over the location. Players may function like game pieces in association with other members on a team and participate in competitions to capture and defend real-world territory as part of the gaming experience. The gaming platform and associated entities may share revenue and other incentives with entities associated with the locations controlled by the players on the game platform.

U.S. Patent App. Pub. No. 2009/0247253 to Leland discloses methods and devices for playing a multi-line card game, e.g. a poker game, are described. An array of cards arranged in columns and rows is provided, together with one or more paylines. Each time a winning combination occurs, the cards involved in the combination are removed and the voids thus formed are filled by new cards, thus creating the possibility of automatic generation of winning combinations. If no winning combination is shown on the array, the player can swap two cards in order to form a desired winning combination.

Foreign Patent App. Pub. No. WO/2014/140125 to Keune discloses new uses of smartphones (1, 1') and comparable mobile digital terminal devices. This comprises uses of a digital terminal device, preferably in the form of a mobile device such as a smartphone or the like, wherein special application software (App) is stored and run on the terminal device and wherein the terminal device (1) is advantageously used together with a holding device (2) arranged or to be arranged on the head of a user (5), particularly in accordance with EP 2 103 862 or EP 2 562 462 or US 2012/0175394 or DE 20 2009 009 326 or DE 24 20 2013 000 740, so that the hands (6) of the user (5) are free and thus additional application possibilities arise during the use of the terminal device (1), for example by using an external controller. Said additional application possibilities relate inter alia to e-book readers of a new type, social games and toys, virtual configurations, for purchasing a motor vehicle for example, a double camera usage in smartphones, music stands of a new type for learning musical instruments and new possibilities for remotely controlling electronic objects such as toys or the like.

Non Patent Literature entitled "Making Learning Fun . . . " found at http://www.makinglearningfun.com/themepages/MathDomino.htm discloses a domino math educational game generally utilizing a set of dominoes upside down on a table, wherein a child picks a domino up and counts the dots on each side of the line on the domino and writes the numbers on a sheet in an appropriate spot. The child then adds, subtracts or multiplies the number and records the result in a box.

Non Patent Literature entitled "Learn To Play 42" found at http://texas42.net/ discloses domino learning games.

Though various learning games have been provided in the art, there remains a need in the art for an educational game platform that provides the ability to select from a plethora of learning games to suit specific child age groups and skill/education levels. Accordingly, there persists a need for educational games that are presented on a platform wherein children can play the games alone, or in conjunction with other players on social media to address the child's specific learning needs. Therefore, it is an object of the present disclosure to obviate the disadvantages from the existing art and to provide a learning game platform that enables a user to select from a plethora of games that teach additional reading and math skills on many different academic levels. It is further an object to provide games that can act as an excellent resource for remedial and/or enrichment purposes for Pre-K through Third-plus grades. It is yet another object to provide an invaluable source of materials for home schooling. It is still another object to provide a game forum that enables students of all ages, including adults, with special needs/learning disabilities, to succeed in learning and reinforce academic skills when playing these games.

SUMMARY OF THE INVENTION

The present invention is directed to methods, systems and apparatus for a learning game platform for an electronic device/mobile device, particularly adapted to be utilized as an app on a mobile device when traveling. Contemplated mobile devices include devices such as, but not limited to, smart phones, laptops or tablets, however, the app can also be utilized on desk-top devices. The subject learning game platform provides a plethora of games teaching additional reading and math skills on many different academic levels. All of these games provide an excellent resource for remedial and/or enrichment purposes for Pre-K through Third-plus grades. They are an invaluable source of materials for home schooling. Students with special needs/learning disabilities of all ages, including adults, succeed in learning and reinforcing academic skills when playing these games. They are also an ideal method of teaching reading and math concepts to children and adults who want and/or need to learn English. Objectively, the learning game platform is appointed to be utilized to successfully teach and reinforce basic skills in reading and math, as well as to promote positive family relationships, and create wonderful memories, simply by playing games and having fun. Playing is learning.

In a first broad embodiment the subject technology provides a platform, app and method of use for an electronic device, generally comprising: a) a server for reading medium and storing user information and games, scores, and user progress within a play and learn app platform; b) said server communicating through the Internet with electronic devices having Internet access operated by at least one player; c) registration means for allowing said player to register with and logon to said play and learn app; d) preference selection means for providing said player ability to enter user preferences, including age, game selection, skill level; e) performance review means for determining strength and weaknesses of said player; f) a digital card deck showing numbers adapted to be utilized for Game Play variations; and g) said Game Play variations including game execution and instructions attending to at least one number recognition game, addition game, subtraction game and multiplication game.

In a second broad embodiment the subject technology provides a platform, app and method of use for an electronic device, generally comprising: a) a server for reading medium and storing user information and games, scores, and user progress within a play and learn app platform; b) said server communicating through the Internet with electronic devices having Internet access operated by at least one player; c) registration means for allowing said player to register with and logon to said play and learn app; d) preference selection means for providing said player ability to enter user preferences, including age, game selection, skill level; e) performance review means to determine strength and weaknesses of said player; f) a digital card deck showing alphabet letters adapted to be utilized for Game Play variations; and g) said Game Play variations including game execution and instructions attending to at least one letter recognition game, three, four and five letter short vowel word, and four and five letter long vowel word games.

In a third broad embodiment, the subject technology provides a platform, app and method of use for an electronic device, generally comprising: a) a server for reading medium and storing user information and games, scores, and user progress within a play and learn app platform; b) said server communicating through the Internet with electronic devices having Internet access operated by at least one player; c) registration means for allowing said player to register with and logon to said play and learn app; d) preference selection means for providing said player ability to enter user preferences, including age, game selection, skill level; e) performance review means to determine strength and weaknesses of said player; and f) a digital domino including a plurality of dominos having a face thereon adapted to be utilized for game variations for learning.

BRIEF DESCRIPTION OF THE DRAWINGS

The advantages and features of the present disclosure will become better understood with reference to the detailed description taken in conjunction with the accompanying drawings, wherein like elements are identified with like symbols, and in which:

FIG. 3b illustrates an embodiment of the game shown in FIG. 3a, showing age/variation of the game being selected via ages three (3) and four (4) year olds, providing a Number Recognition Variation game;

FIG. 3f illustrates another variation of the embodiment of the game shown in FIG. 3b, showing age/variation of the game being selected via ages three (3) and four (4) year olds, providing a Number Recognition Variation game;

FIG. 4a illustrates an embodiment of a learning game offered by the platform, showing the set-up of an educational learning game—Counting by Tens;

FIG. 4b illustrates the Game Play of the learning game shown in FIG. 4a;

FIG. 5 illustrates an embodiment of a learning game offered by the platform, showing the set-up of an educational learning game—Number Recall 0 through 25;

FIG. 6 illustrates an embodiment of a learning game offered by the platform, showing the set-up of an educational learning game—ABC RECALL A Memory Game Capital Letters—ABC Recall;

FIG. 7a illustrates an embodiment of a learning game offered by the platform, showing the set-up of an educational learning game—Happy Face Number Dominoes;

FIG. 7b illustrates a Game Play configuration of the learning game shown in FIG. 7a;

FIG. 7c illustrates another Game Play configuration of the learning game shown in FIG. 7a;

FIG. 8a illustrates an embodiment of a learning game offered by the platform, showing the set-up of an educational learning game—Happy Face Letter Dominoes: Capital Letters A to H;

FIG. 8b illustrates a Game Play configuration of the learning game shown in FIG. 8a;

FIG. 8c illustrates another Game Play configuration of the learning game shown in FIG. 8a;

FIG. 9 illustrates an embodiment of a learning game offered by the platform, showing the set-up of an educational learning game—Opposites Picture Match Game;

FIG. 10a illustrates an embodiment of a learning game offered by the platform, showing the set-up of an educational learning game—Match and Missing Letters—Four Letter Long Vowel Words;

FIG. 10b illustrates an embodiment of a learning game offered by the platform, showing the set-up of an educational learning game of FIG. 10a modified for five letter vowel words—Match and Missing Letters—Five Letter Long Vowel Words;

FIG. 11a illustrates an embodiment of a learning game offered by the platform, showing the set-up of an educational learning game—Match and Missing Letters—Four Letter Short Vowel Words;

FIG. 11b illustrates an embodiment of a learning game offered by the platform, showing the set-up of an educational learning game of FIG. 11a modified for five letter short vowel words—Match and Missing Letters—Five Letter Short Vowel Words;

FIG. 12 illustrates an embodiment of a learning game offered by the platform, showing the set-up of an educational learning game—What Do You Hear?;

FIG. 13a illustrates an embodiment of a learning game offered by the platform, showing the set-up of an educational learning game—Addition with Pegs;

FIG. 13b illustrates an embodiment of a learning game offered by the platform, showing the set-up of an educational learning game of FIG. 13a modified for subtraction—Subtraction with Pegs;

FIG. 13c illustrates the Game Play rules of FIGS. 13a and 13b;

FIG. 14a illustrates an embodiment of a learning game offered by the platform, showing the set-up of an educational learning game—Give And Take, showing the Game Play and objectives;

FIG. 14b illustrates an embodiment of a learning game offered by the platform, showing the set-up of an educational learning game of FIG. 14a setting forth a Game Play money poem;

FIG. 15 illustrates an embodiment of a learning game offered by the platform, showing the set-up of an educational learning game—Lucky Letters Dice Game—Capital Letters;

FIG. 16 illustrates an embodiment of a learning game offered by the platform, showing the set-up of an educational learning game—Match and Missing Letters—Three Letter Words;

FIG. 17a illustrates an embodiment of a learning game offered by the platform, showing the set-up of an educational learning game—Roll'em—Three Games in One, showing Game One;

FIG. 17b illustrates an embodiment of a learning game offered by the platform, showing the set-up of an educational learning game—Roll'em—Three Games in One, of FIG. 17a, showing Game Two;

FIG. 17c illustrates an embodiment of a learning game offered by the platform, showing the set-up of an educational learning game—Roll'em—Three Games in One, of FIG. 17a, showing Game Three;

FIG. 18 illustrates an embodiment of a learning game offered by the platform, showing the set-up of an educational learning game—Spin For Numbers 0-25;

FIG. 19 illustrates an embodiment of a learning game offered by the platform, showing the set-up of an educational learning game—ABC Recall—Capital Letters;

FIG. 20a illustrates an embodiment of a learning game offered by the platform, showing the set-up of an educational learning game—Highest Count, showing set-up and Game Play;

FIG. 20b illustrates an embodiment of a learning game offered by the platform, showing the set-up of an educational learning game of FIG. 20a, showing implementation of a money poem;

FIG. 21 illustrates another embodiment of a subject learning game platform Learning Game—Word Recall—Sight Vocabulary Words;

FIG. 22a illustrates another embodiment of a subject learning game platform Learning Game—Word Puzzles, Sight Vocabulary Words;

FIG. 22b illustrates the scoring for the game of FIG. 22a;

FIG. 23 illustrates another embodiment of a subject learning game platform Learning Game—Spin for Words—Sight Vocabulary Words;

FIG. 24a illustrates another embodiment of a subject learning game platform Learning Game—Fishing for Words Sight Vocabulary;

FIG. 24b illustrates the Game Play for the game of FIG. 24a;

FIG. 25a illustrates another embodiment of a subject learning game platform Learning Game—Match and Missing Letters—Sight Vocabulary Words;

FIG. 25b illustrates the Game Play for the game of FIG. 25a.

DETAILED DESCRIPTION OF THE DISCLOSURE

Figure 1:
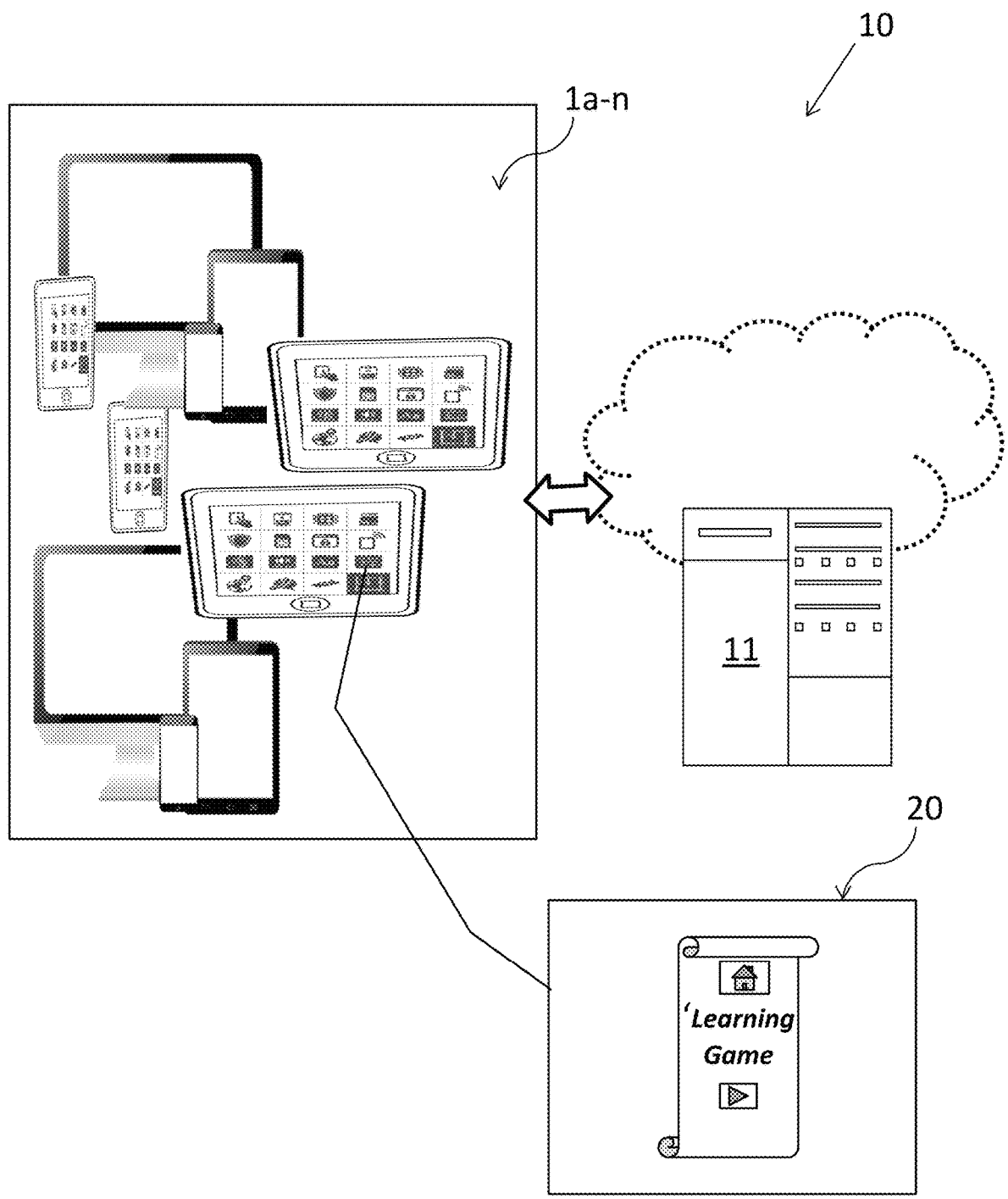
FIG. 1 illustrates an environment in which various embodiments of the present learning game platform may be practiced.

The best mode for carrying out the present disclosure is presented in terms of the embodiment, herein depicted in the Figures. The embodiment(s) described herein detail for illustrative purposes and may be subject to many variations. It is understood that various omissions and substitutions of equivalents are contemplated as circumstances may suggest or render expedient, but are intended to cover the application or implementation without departing from the spirit or scope of the present disclosure. Further, it is to be understood that the phraseology and terminology employed herein are for the purpose of the description and should not be regarded as limiting. Any headings utilized within description are for convenience only and have no legal or limiting effect.

The terms "a" and "an" herein do not denote a limitation of quantity, but rather denote the presence of at least one of the referenced item.

The subject learning game platform provides a learning environment wherein learning is demonstrated through play so that children can learn and develop skills and accordingly, playing is learning. The subject learning game platform provides instructive games that are fun and enjoyable—yet educational—for children ages three (3) to eight (8+), and beyond. Interactive digital games executed and provided by the platform are played in real time executed on a protected infrastructure. It is available for download and execution on electronic devices, including all computers, desktops, laptops, tablets and mobile devices such as a Smartphone, devices sold under the trade name iPhone, devices sold under the trade name Android, devices sold under the trade name Windows 8 Phone, devices sold under the trade name Android Tab, devices sold under the trade name Apple iPad and on social media sites, such as that associated with the trade name Face book.

Parents frequently discourage their children from constant playing electronic games with a computer or mobile device where children only play alone, isolating themselves into their own little worlds. The subject learning game platform provides real time interactive playing providing ten-minute games with easy directions that teach and reinforce basic skills in reading and math and at the same time get families to sit down and interact with one another. They can be played at home sitting around a table or sitting next each other, but also in restaurants, doctors' offices, in the car, on airplanes—wherever and whenever parents and children can share time to play and learn together.

The subject learning game platform gives adults a constant opportunity to praise a child when something is done correctly, instilling positive attitudes, confidence and builds self-esteem. At the same time, playing also promotes positive relationships between parents and children. Most young children do not like to talk on the phone, even with a parent or grandparent. They will barely say hello or goodbye. From a distance, parents who are traveling, military families, grandparents, other friends or relatives can call on the telephone to interact with their children, playing games with them in Real Time on their individual computers or mobile devices. In just ten minutes' time playing a game will allow families a time to relax and provide an opportunity to talk, laugh and share stories with their children. Rather than children watching TV while mom and dad attend to household matters, the better option would be to call grandma, grandpa or other friends or family members to play games with the children. Families that play together stay together and create wonderful memories.

The subject learning game platform provides a plethora of games teaching additional reading and math skills on many different academic levels. All of these games provide an excellent resource for remedial and/or enrichment purposes for Pre-K through Third-plus grades. They are an invaluable source of materials for home schooling. Students with special needs/learning disabilities of all ages, including adults, succeed in learning and reinforcing academic skills when playing these games. They are also an ideal method of teaching reading and math concepts to children and adults who want and/or need to learn English. Objectively, the subject learning game platform is appointed to be utilized to successfully teach and reinforce basic skills in reading and math, as well as to promote positive family relationships and creating wonderful memories, simply by playing games and having fun. Real time playing and execution is provided by live streaming supported in general via 3G, 4G, LTE networks of mobile operator and Broadcast Multicast Service Centers (BMSC).

Figure 2:
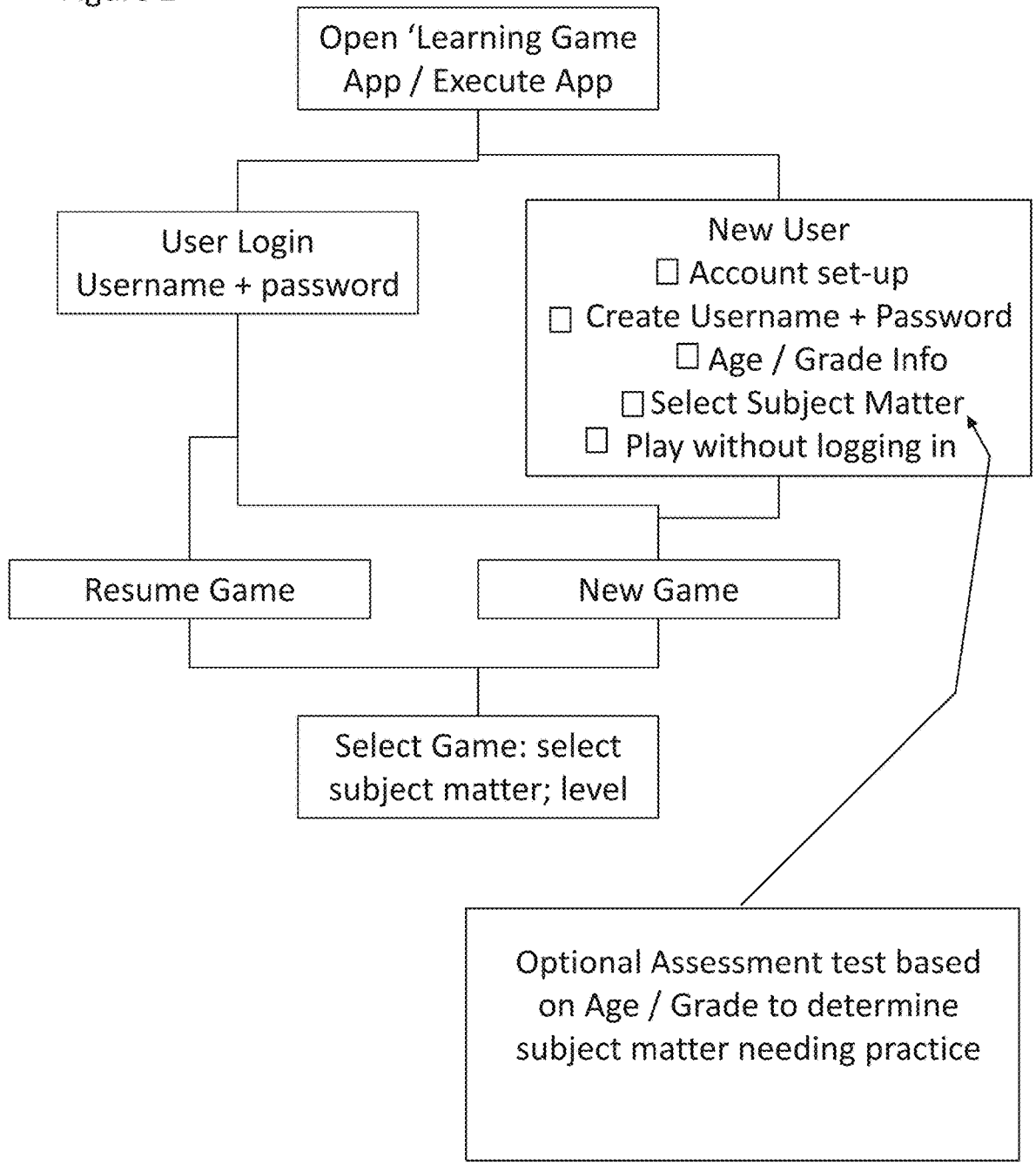
FIG. 2 illustrates a block diagram of an embodiment of the subject learning game platform for providing transmission, data access, interaction and execution of a plethora of learning games across a network, in accordance with an embodiment of the present disclosure.

FIGS. 1-2 illustrate an underlying embodiment of the subject learning game platform, app and method of use. Referring to FIGS. 1-2 collectively, in operation, a user downloads the learning game platform App on his/her mobile device, tablet, and/or desk-top and sets up a user account. The App may be used in a classroom setting; at home; or any where Internet access is available. The subject learning game platform is shown at 10. A server 11 is provided for reading medium and storing user information and games, scores, and user progress within the learning game platform. Server 11 communicates through the Internet with electronic devices having Internet access operated by player 1a-n. Player 1a-n can download the learning game platform app 20 onto their mobile and/or desktop devices. After downloading the subject learning game platform software/application program onto a player's 1a-n mobile device, a player can register on the device by setting-up a user account/or login to the app if the user already has an account or arranging for an in-app purchase. After the player 1a-n logs in or registers, the player can enter/modify his/her user preferences, such as contact information, select hyperlinks for learning games he/she is interested playing, select performance review to determine strength and weaknesses. The player also selects age, skill level, Game Play, and cards/specific game selections.

Figure 3A:
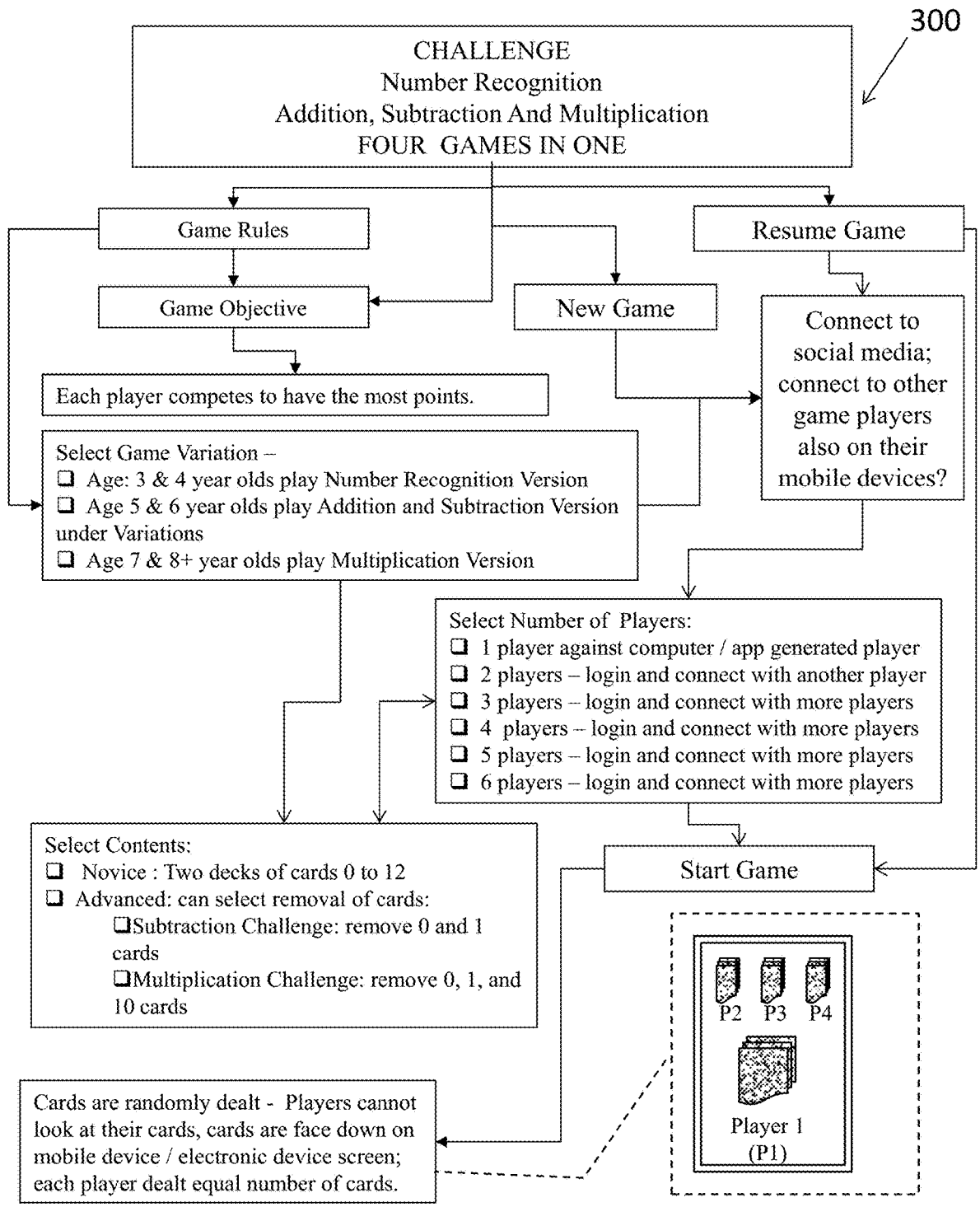
FIG. 3a illustrates an embodiment of the platform showing the set-up of a game, whereupon age/variation of a game is selected.
Figure 3C:
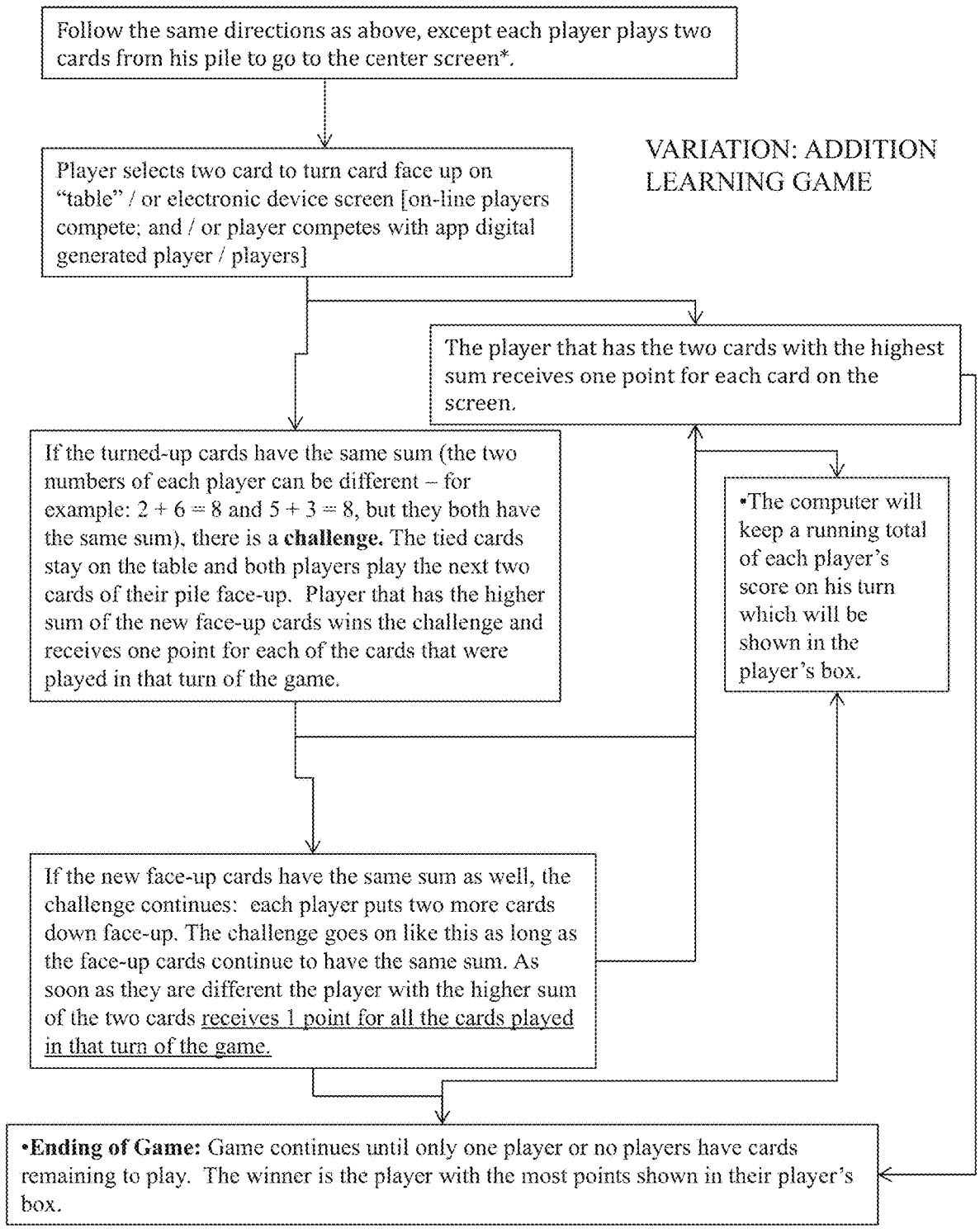
FIG. 3c illustrates an embodiment of the game shown in FIG. 3a, showing age/variation of the game being selected via ages five (5) and six (6) year olds, providing an addition game variation.
Figure 3D:
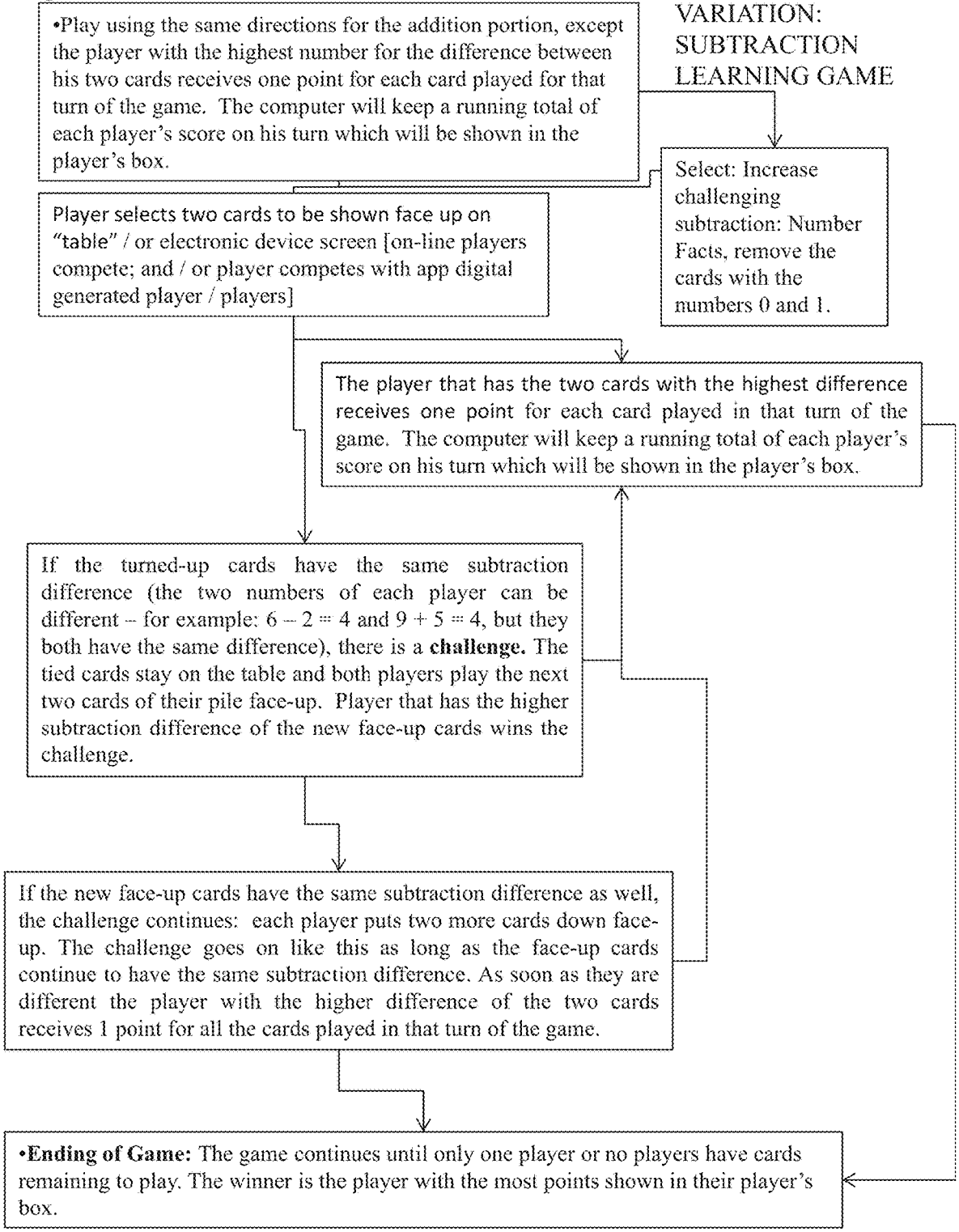
FIG. 3d illustrates an embodiment of the game shown in FIG. 3a, showing age/variation of the game being selected via ages five (5) and six (6) year olds, providing a subtraction game variation.
Figure 3E:
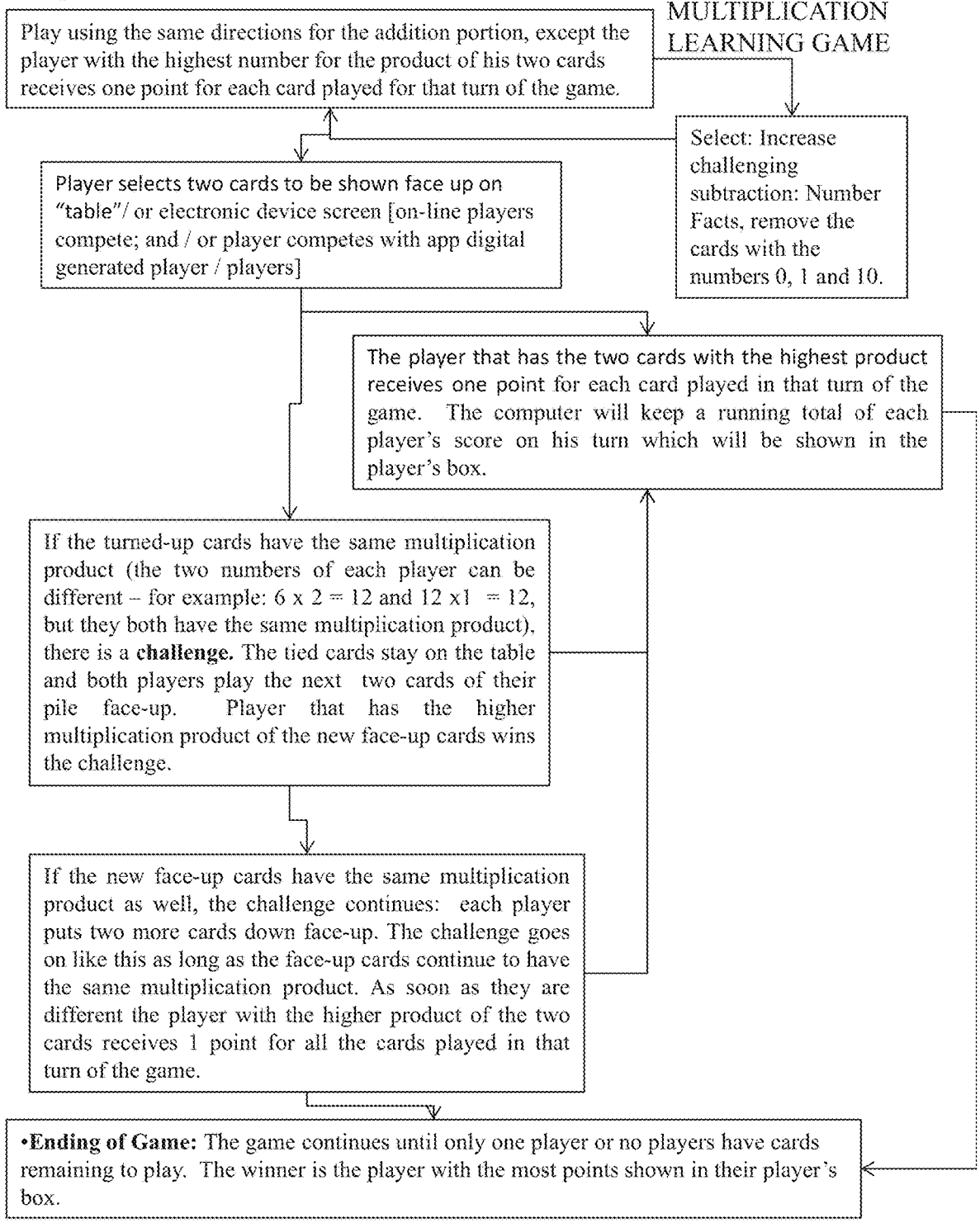
FIG. 3e illustrates an embodiment of the game shown in FIG. 3a, showing age/variation of the game being selected via ages seven (7) and eight (8) year olds, providing a multiplication game variation.

FIG. 3a-3e show an embodiment of the learning game platform Learning Game—Number Recognition: player/players select learning math category: Addition, Subtraction and/or Multiplication, thus providing four games in one. FIG. 3a sets forth the set-up of the game, whereupon the age/variation of the game are selected as shown at 300. The preferable age range for the game is three (3) to eight (8+); however more complex games utilizing more complex mathematical concepts may be provided for older children/adults. Preferably, specific age ranges are assigned for each math category or game variation. For example, preferably ages three (3) and four (4) year olds are recommended to play a Number Recognition Variation, as shown in FIG. 3b. Five (5) and six (6) year olds are recommended to play Addition and Subtraction Variations, as shown in FIGS. 3c and 3d. Seven (7) and eight (8) year olds are recommended to play Multiplication Variation, as shown in FIG. 3e. The NUMBER OF PLAYERS is prompted for selection by the player 1. Player 1 may elect to play alone, in which case player 1 will be challenged as against the program of the app. Alternatively, player 1 may select to play with others on his/her digital device and in which case player 1 may connect to social media sites such as Face book, Twitter, etc. and connect to "friends" therein; or alternatively the subject app may have a social media site connection board wherein player 1 can log onto the site and select the players he/she wants to play with. Alternatively, player 1 may indicate that he/she wishes to play against random players who are currently online playing the game. Players selected may range from single player (against the app platform software) or two to six players. Next, the player/players select the card deck number configuration. Preferably, two digital decks of cards number 0 to 12 are utilized as the base configuration. The player/players may select to increase the challenge level of the game _Novice: Two decks of cards 0 to 12; _Advanced: can select removal of cards: _Subtraction Challenge: remove 0 and 1 cards; Multiplication Challenge: remove 0, 1, and 10 cards. The object of the game is that the player/players compete to have the most points at the end of the game. In an alternative embodiment, the object of the game is that the player/players compete to have the most cards, which translate to points, at the end of the game. The digital cards are randomly dealt by the app software program. Each player has a pile of an equal number of cards dealt, that are placed face down in his/her player's box If only a single player up to four players are playing, at least two decks of cards number 0 to 12 are utilized; if more than four players are playing, at least four decks of cards number 0 to 12 are utilized, dealing until all cards are evenly dealt. The cards are placed face down in front of the player/players, on the electronic device screen, as shown generally in FIG. 3a. Each player's cards are face down, and optionally each of the other player's cards is also shown face down. As player 1 flips his/her card, the face of the selected card is shown; each of the other players' selected flipped card is preferably also displayed for all the players to see, as shown generally in FIG. 3b. As shown in FIG. 3b, player 1 (P1) has a value of 8; P2 has a card value 3; P3 has a card value 3; and P4 has a card value 7. P1 has the greatest card value of 8 and therefore, P1 wins the round and P1 receives one point for each of the cards of P2, P3 and P4 (the computer will keep a running total of each player's score on his turn which will be shown in the player's box), as indicated in FIG. 3b. If another player had an 8 like P1, then a challenge would have to take place between P1 and the other player, as described in FIG. 3b. If the greatest face value of the face-up cards in the middle of the table are equal there is a challenge. The tied players play the next card of their pile. The player with the higher of the new cards wins the challenge If the new cards are equal as well, the challenge continues: each tied player plays another card. The challenge goes on like this as long as the cards continue to be equal. As soon as they are different, the player of the higher card receives one point for each of the cards played in that turn of the game. The game continues until only one player or no players have cards remaining to play. The winner is the player with the most points shown in their player's box.

Variations of the game challenge of FIGS. 3a and 3b are shown in FIGS. 3c-3e. FIG. 3c illustrates the addition variation of the game challenge of FIG. 3a. FIG. 3d illustrates the subtraction variation of the game challenge of FIG. 3a. FIG. 3e illustrates the multiplication variation of the game challenge of FIG. 3a. In each of the variations, the same directions are followed as set forth when referring to FIGS. 3a and 3b, except each player places two cards down on the table for each of the addition, subtraction and multiplication variation games.

The player that has the two cards with the highest addition sum or subtraction difference or multiplication product receives one point for each card played in that turn of the game. Again, if the turned-up cards have the same sum, for example in the addition variation as shown in FIG. 3c, the two numbers of each player can be different—for example: 2+6=8 and 5+3=8, but they both have the same sum, therefore there is a challenge. The tied cards stay on the "table"/or digital screen of the electronic device and both players play the next two cards of their pile face-up. As described hereinabove in reference to FIGS. 3a and 3b, the player that has the higher sum of the new face-up cards wins the challenge. If the new face-up cards have the same sum as well, the challenge continues: each player puts two more cards down face-up. The challenge goes on like this as long as the face-up cards continue to have the same sum. As soon as they are different the player with the higher sum of the two cards receives one point for each card played in that turn of the game. The challenge continues until only one player or no players have cards remaining to play. The winner is the player who has the most points shown in their player's box.

The subtraction variation is shown in FIG. 3d. Again, the game is played as described in FIGS. 3a and 3b, except the player with the highest number for the difference between his/her two cards receives one point for each card played in that turn of the game. The challenge continues until only one player or no players have cards remaining to play. The winner is the player with the most points shown in their player's box. For more challenging subtraction Number Facts, remove the cards with the numbers 0 and 1.

The multiplication variation is shown in FIG. 3e. Again, the game is played as described in FIGS. 3a and 3b, except the player with the highest number for the product of his two cards receives one point for each card played in that turn of the game. Challenge continues until only one player or no players have cards remaining to play. The winner is the player with the most points shown in their player's box. For more challenging multiplication Number Facts, remove the cards with the numbers 0, 1 and 10. Throughout the game parents/caregivers/educators may be prompted to praise the players. For instance, the parent/caregiver/educator may be a listed player whereupon the game discretely prompts the parent/caregiver/educator to praise the players.

Each challenge has an educational goal. The goal of the subject learning game is to reinforce number recognition 0 to 12, addition, subtraction and multiplication, develop fine motor skills by using small muscles in the hands, encourage the child's expressive language, build self-esteem, enhance interaction between adult and child, and accomplishing these goals simply by having fun playing games with family and friends.

FIG. 3f illustrates another variation of the embodiment of the game shown in FIG. 3b, showing age/variation of the game being selected via ages three (3) and four (4) year olds, providing a Number Recognition Variation game. Ages 3 & 4 year olds play Number Recognition; NUMBER OF PLAYERS: 2 to 6; CONTENTS: Two decks of cards 0 to 12; OBJECTIVE: Each player competes to have the highest score. SETUP: Each player has a pile of an equal number of cards that are placed face down in their player's box. GAME PLAY: Number Recognition: First player clicks on his top card and the computer will bring the card to the center of the screen face up. Each player in turn clicks his top card to bring it to the center of the screen. The player with the highest card receives one point for each of the cards that were played in that turn of the game. The computer will keep a running total of each player's score on his turn which will be shown in the player's box. If the cards in the middle of the screen are equal there is a challenge. The tied players play the next card of their pile. The player with the higher of the new cards wins the challenge. If the new cards are equal as well, the challenge continues: each tied player plays another card. The challenge goes on like this as long as the cards continue to be equal. As soon as they are different, the player of the higher card receives one point for each of the cards that were played in that turn of the game. Ending of Game: Game continues until only one player or no players have cards remaining to play. The winner is the player with the most points shown in their player's box.

FIGS. 4a-4b illustrate another embodiment of a subject learning game platform Learning Game—COUNTING BY TENS: The educational goal of the game embodiment is to teach and reinforce number recognition for numbers 1 to 100, including counting 1 through 100, number sequences and counting by tens. This game develops fine motor skills by using small muscles in the hands, strengthens eye-hand coordination, and allows interaction between adult and child which encourages family unity and creates wonderful memories, and gives adults an opportunity to praise a child when something is done correctly. Playing in real time also enhances the child's expressive language, builds self-esteem, and accomplishes these goals simply by HAVING FUN playing games with family and friends. AGES: 3 to 7; NUMBER OF PLAYERS: 2 to 4; OBJECTIVE: Each player competes to be the winner of the game. Three number grids as follows: one 1 through 50, one 51 through 100 and one 1 through 100. White tiles with blue face with black numbers for the numbers used when counting by Tens, all other numbers are white tiles with black numbers. "Sorry" tiles—white tiles that say "Sorry" on them. SETUP: 2 Players—1 half grid of either, 1 to 50 or 50 to 100. Ten "Sorry" Tiles; 3 Players—One complete grid 1 to 100. Twenty "Sorry" Tiles; 4 Players—One complete grid 1 to 100; Twenty "Sorry" Tiles. Steps for playing the game include: 1. One number grid with a pool of corresponding number tiles (face down) is viewed on the screen. 2. First player takes five tiles from the pool to play on the number grid. 3. If one to four "Sorry" tiles (a tile with no number on it) are drawn, player loses that many chances to match a number on the grid. He then places the other tiles correctly on the corresponding numbers on the number grid. The "Sorry" tiles are put in a "discard pile." 4. If five "Sorry" tiles are drawn, player loses his turn and play goes to the next player. 5. After a player places his tiles on the number grid, the computer will calculate his total number of points for that turn: 1 point for each white number tile matched on the number grid; 0 points for the "Sorry" tiles; 5 points for a blue number tile. 6. Next player, and then each in turn, take five tiles and continue in the same manner. 7. Ending the Game: The game ends when players finish matching all blue number tiles on the number grid. The player with the most points is the winner.

FIG. 5 illustrates another embodiment of a subject learning game platform Learning Game—NUMBER RECALL—0 to 25. The educational goal is to teach and reinforce recognition of numbers 0 to 25. This game develops fine motor skills by using small muscles in the hands, strengthens eye-hand coordination, and allows interaction between adult and child which encourages family unity and creates wonderful memories, and gives adults an opportunity to praise a child when something is done correctly. Playing in real time also enhances the child's expressive language, builds self-esteem, and accomplishes these goals simply by HAVING FUN playing games with family and friends. AGES: 3 to 7; _NUMBER OF PLAYERS: 2 to 4 players; OBJECTIVE: To collect the most matched sets of two. SETUP: Five groups containing two of each number as follows: Group 1—0 through 5; Group 2—6 through 11; Group 3—12 through 17; Group 4—18 through 23; Group 5—24, 25, 12, 15, 19, 13. GAME PLAY: 1) On each turn, a player chooses two pictures (one at a time). If the numbers match, the player receives one point and takes another turn—as calculated by the computer for each player at the end of each player's turn; 2) If the player gets another match he gets another turn until he does not make a match before it goes to the next player; 3) When a player chooses two pictures that are not matching numbers, it becomes the next player's turn. Ending of Game: Continue play in the same manner until all numbers are matched. The winner is the player with the most points. Variations: 18, 24, and 36 pictures to a game.

FIG. 6 illustrates another embodiment of a subject learning game platform Learning Game—ABC RECALL—A Memory Game CAPITAL LETTERS—ABC Recall. The educational goal is to teach and reinforce recognition of capital letters A to Z. AGES: 3 to 7; NUMBER OF PLAYERS: 2 to 4 players. CONTENTS: Two sets of identical cards A to Z. OBJECTIVE: To collect the most matched sets of two. SETUP: Separate cards into five groups containing two of each capital letter card as follows: Group 1—A through F; Group 2—G through L; Group 3—M through R; Group 4—S through X; Group 5—Y and Z plus four other letters used from another group. GAME PLAY: 1. On each turn, a player chooses two pictures (one at a time). If the numbers match, the player receives one point and takes another turn. Computer calculates the number of points for each player at the end of each player's turn; 2. If the player gets another match he gets another turn until he does not make a match before it goes to the next player; 3. When a player chooses two pictures that are not matching letters, it becomes the next player's turn. Ending of Game: Continue play in the same manner until all letters are matched. The winner is the player with the most points. Variations: 18, 24, and 36 pictures to a game. Optionally, difficulty may be based on time: No time: ages 3-5; 3 minute timer: ages 6-7; 1 minute timer: age 8 and above.

Figure 7B:
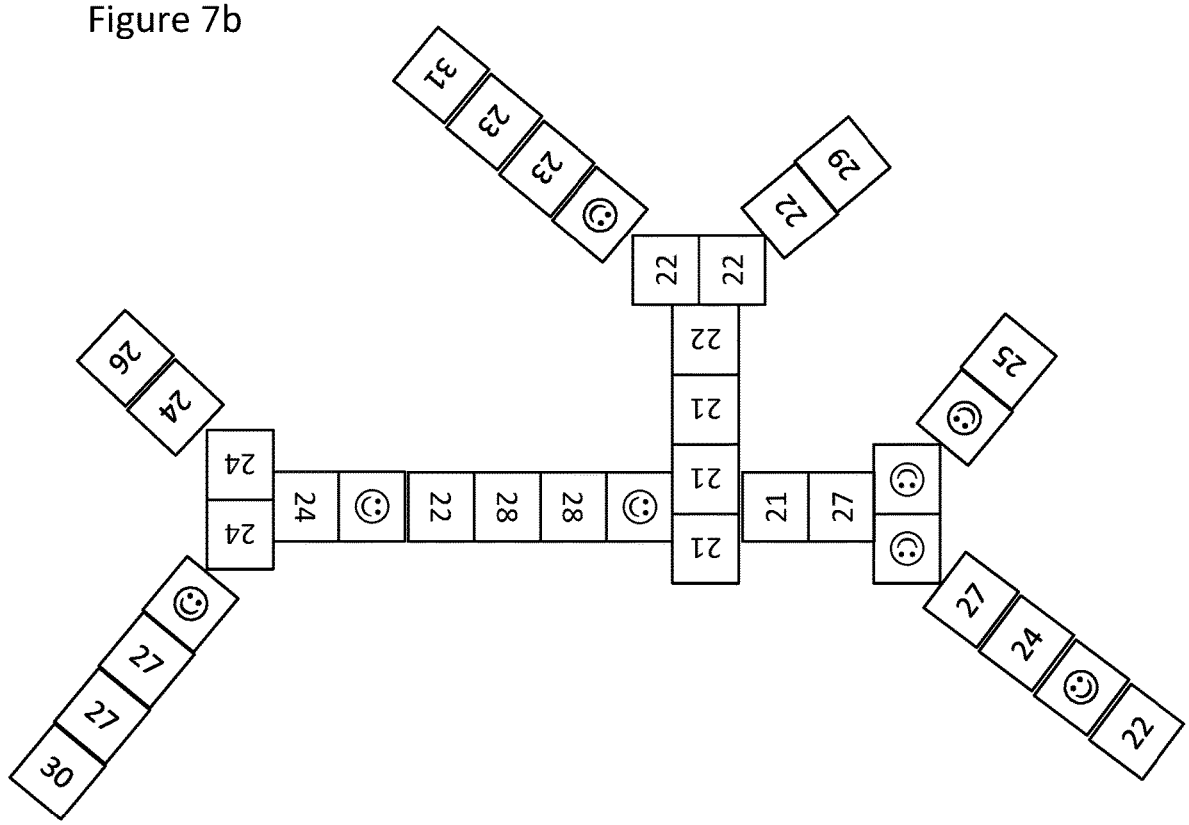
Figure 7C:
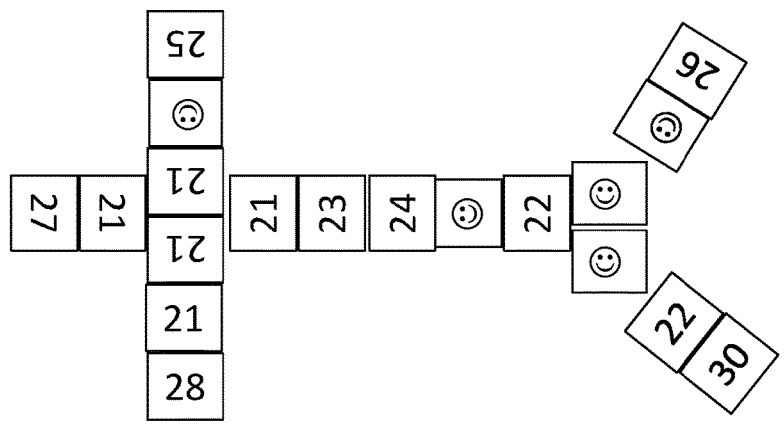

FIGS. 7a-7c illustrate another embodiment of a subject learning game platform Learning Game—HAPPY FACE NUMBER DOMINOES—NUMBERS 21 to 31; AGES: 3 to 7; NUMBER OF PLAYERS: 2 to 8. OBJECTIVE: To be the first player to use all of his/her dominoes. SETUP 1) All dominoes face down; 2) Each player picks seven dominoes. All other dominoes are set aside as the "Reserve Pile." GAME PLAY: The happy face on the domino is wild. It can be used as any number. The double "Happy Face" domino can only be used as a double. The person with the double "21" or the double "Happy Face" domino is the first player, and he/she places it in a vertical position. Double number dominoes thereafter are always placed in a position that is perpendicular to the other dominoes. Every time a double number domino is played it must be matched twice before any other numbers can be matched. If player has a matching domino, it must be played. If player does not have a domino in his/her hand that matches the dominoes already played, then he/she must pick one domino from the "Reserve Pile." If the domino picked can be played, he/she must play it. If not, the player adds the domino to his/her dominoes and the play goes to the next player in a clockwise direction. Play continues until one player has played all of his/her dominoes. See FIG. 7b, which shows a possible continuous play of a game. If no player has the double "21" or double "happy face: The players roll the die provided. The player that rolls the lowest number is the first to take one domino from the "Reserve Pile" and then each player picks another domino from the pile until someone picks the double "21" or double "Happy Face." If it is not one of those two doubles, the player adds the domino to his/her dominoes and continues to the next player in a clockwise direction. WHENEVER A DOUBLE NUMBER IS PLAYED: As the game progresses the double "21" or the double "Happy Face" which started the game can be matched on its two other sides. (See FIG. 7c) All other double dominoes played in the game will be matched two times, one match for each corner of the double domino. (See FIG. 7c). Players must identify the number name of the domino he/she is matching. Adults or other players are encouraged to help, if necessary, saying the number name and having the child repeat it.

Figure 8B:
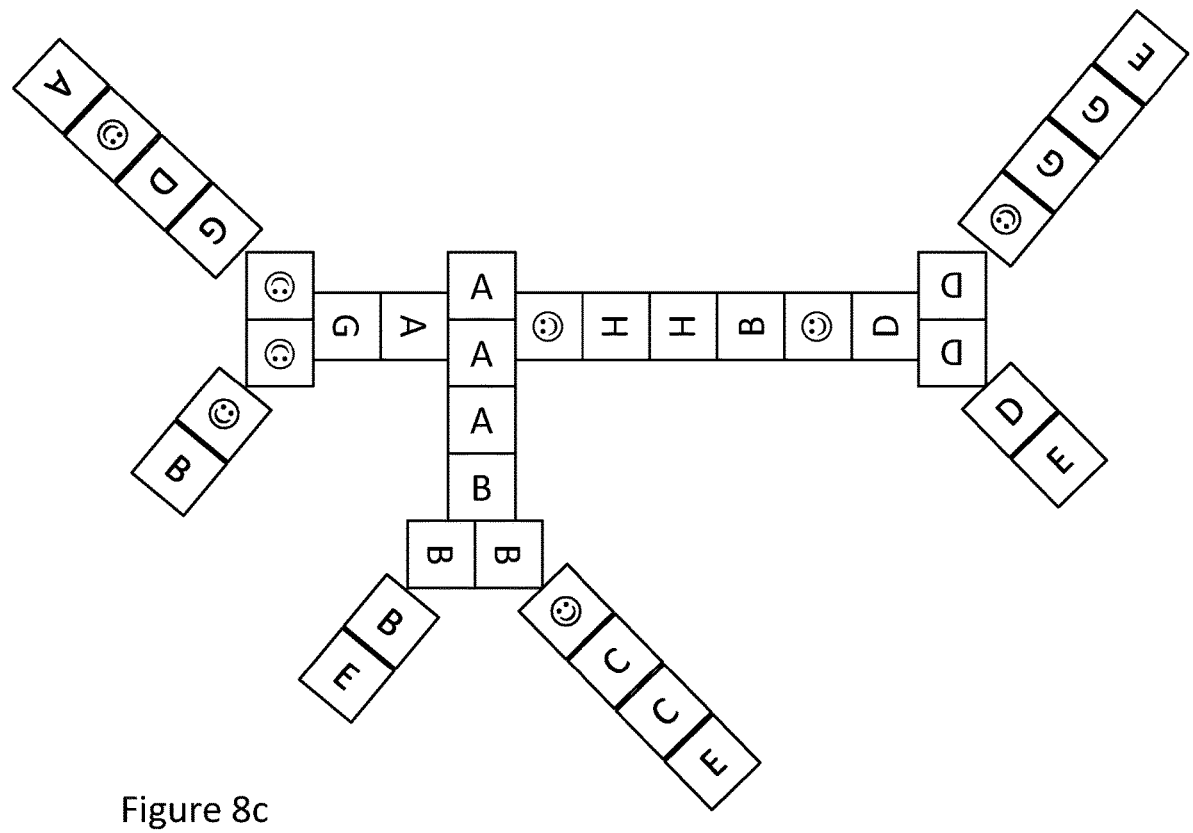
Figure 8C:
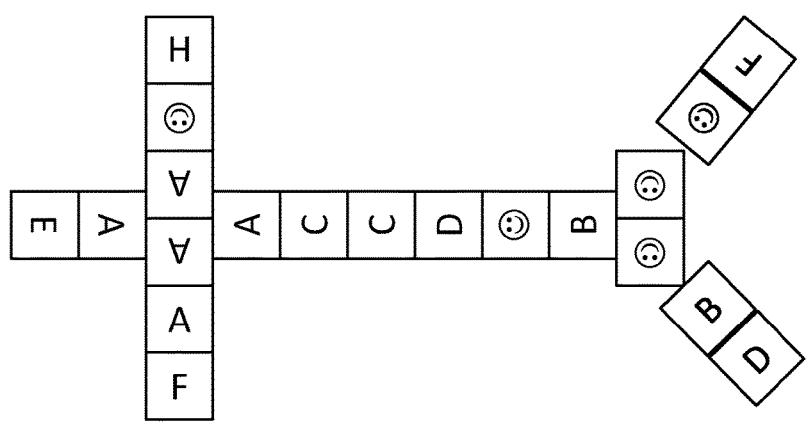

FIGS. 8a-8c illustrate another embodiment of a subject learning game platform Learning Game—HAPPY FACE LETTER DOMINOES: CAPITAL LETTERS A to H. AGES: 3 to 7. NUMBER OF PLAYERS: 2 to 8. OBJEC- TIVE: To be the first player to use all of his/her dominoes. SETUP: All dominoes face down. Each player picks seven dominoes. All other dominoes are set aside as the "Reserve Pile." GAME PLAY: 1) The happy face on the domino is wild. It can be used as any letter. The double "Happy Face" domino can only be used as a double. 2) The person with the double "A" or the double "Happy Face" domino is the first player, and he/she places it in a vertical position. Double letter dominoes thereafter are always placed in a position that is perpendicular to the other dominoes. 3) Every time a double letter domino is played it must be matched twice before any other letters can be matched. 4) If player has a matching domino, it must be played. 5) If player does not have a domino in his/her hand that matches the dominoes already played, then he/she must pick one domino from the "Reserve Pile." If the domino picked can be played, he/she must play it. If not, the player adds the domino to his/her dominoes and the play goes to the next player in a clockwise direction. 6) Play continues until one player has played all of his/her dominoes. See FIG. 8b, which shows a possible continuous play of a game. IF NO PLAYER HAS THE DOUBLE "A" OR DOUBLE "HAPPY FACE: The players roll the die provided. The player that rolls the lowest number is the first to take one domino from the "Reserve Pile" and then each player picks another domino from the pile until someone picks the double "A" or double "Happy Face." If it is not one of those two doubles, the player adds the domino to his/her dominoes and continues to the next player in a clockwise direction. WHENEVER A DOUBLE LETTER IS PLAYED: As the game progresses the double "A" or the double "Happy Face" which started the game can be matched on its two other sides. (See FIG. 8c); All other double dominoes played in the game will be matched two times, one match for each corner of the double domino. (See FIG. 8c). Players must identify the letter name of the domino he/she is matching. Adults or other players are encouraged to help, if necessary, saying the letter name and having the child repeat it.

FIG. 9 illustrates another embodiment of a subject learning game platform Learning Game—OPPOSITES PICTURE MATCH GAME. EDUCATIONAL GOAL: To teach and reinforce vocabulary and the meaning of opposites. This game develops fine motor skills by using small muscles in the hands, strengthens eye-hand coordination, and allows interaction between adult and child which encourages family unity and creates wonderful memories, and gives adults an opportunity to praise a child when something is done correctly. Playing in real time also enhances the child's expressive language, builds self-esteem, and accomplishes these goals simply by HAVING FUN playing games with family and friends. OBJECTIVE: Each player competes to get the highest score. SETUP: Players choose 2 cards from 8 sets of Picture Cards with corresponding pictures for matching opposites. GAME PLAY: 1) Two Picture cards with a pool or deck of corresponding opposite pictures (face down) are viewed on the screen. 2) First player takes two pictures from the pool or deck to play on either of the two Picture Cards showing on the screen: 3) Player places his 2 pictures correctly on the opposite pictures on either of the Picture Cards. 4) If a "Sorry" card (a card with no picture on it) is drawn, player loses one chance to match an opposite picture on the Picture Cards. He then places the other picture correctly on either Picture Card. The "Sorry" card is put in a "discard pile." 5) If two "Sorry" cards are drawn, player loses his turn and play goes to the next player. 6) After a player places his pictures on the Picture Cards, the computer will calculate his total number of points for that turn: 1 point for each picture matched with its opposite on the Picture Cards; 0 points for the "Sorry" card; 5 points when a picture matched completes all the matching of opposite pictures on a Picture Card; Next player, and then each in turn, takes two pictures and continues in the same manner. Ending the Game: The game ends when players finish matching all opposite pictures on the two Picture Cards. The player with the most points is the winner.

FIGS. 10a and 10b illustrate another embodiment of a subject learning game platform Learning Game—MATCH AND MISSING LETTERS—FOUR & FIVE LETTER LONG VOWEL WORDS, respectfully. Match and missing letters is also available with three letter short vowel words. EDUCATIONAL GOAL: To teach and reinforce recognition and sounding out of four letter long vowel words. This game develops fine motor skills by using small muscles in the hands, strengthens eye-hand coordination, and allows interaction between adult and child which encourages family unity and creates wonderful memories, and gives adults an opportunity to praise a child when something is done correctly. Playing in real time also enhances the child's expressive language, builds self-esteem, and accomplishes these goals simply by HAVING FUN playing games with family and friends. OBJECTIVE: Each player competes to get the highest score. SETUP: 1. Players choose 2 cards from 8 sets of Picture/Word Cards to play. 2. Players determine which side of the Picture/Word Cards will be used for the game: Side 1, showing all letters of each word to be matched, or Side 2, showing some letters of each word to be matched and there is one missing letter, a blank space that is to be filled in with the correct letter. Go over Long Vowel Rule Chart so children will remember the sound each vowel makes. GAME PLAY: 1. Two Picture/Word cards with a pool of corresponding letter tiles (face down) are viewed on the screen. 2. First player takes two tiles from the pool to play on either of the two Picture/Word Cards showing on the screen: On the matching side of the Picture/Word cards, player places his 2 tiles correctly on the corresponding letters. On the matching and filling in the missing letters side of the Picture/Word Cards, player places his tiles correctly on the corresponding letters and/or fills in the correct missing letters. 3. If a "Sorry" (a tile with no letter on it) is drawn, player loses one chance to match or fill in a letter. He then places the other tile correctly on the corresponding letter or fills in a blank of either Picture/Word card. The "Sorry" tile is put in a "discard pile." 4. If two "Sorry" tiles are drawn, player loses his turn and play goes to the next player. 5. After a player places his tiles on the Picture/Word cards, the computer will calculate his total number of points for that turn: 1 point for each letter tile matched on the Picture/Word cards; 2 points for each letter tile filled in on a missing letter of the Picture/Word cards; 0 points for the "Sorry" tile; 5 points when a letter tile matched or filled in completes the spelling of the word (Computer will sound out each letter of the word and then says the word). 6. Next player, and then each in turn, takes two tiles and continues in the same manner. 7. Ending the Game: The game ends when players finish matching and/or filling in all letters on the two Picture/Word Cards. The player with the most points is the winner.

FIGS. 11a and 11b illustrate another embodiment of a subject learning game platform Learning Game—MATCH AND MISSING LETTERS—FOUR & FIVE LETTER SHORT VOWEL WORDS, respectfully. EDUCATIONAL GOAL: To teach and reinforce recognition and sounding out of four letter short vowel words. This game develops fine motor skills by using small muscles in the hands, strengthens eye-hand coordination, allows interaction between adult and child which encourages family unity and creates wonderful memories, and gives adults an opportunity to praise a child when something is done correctly. Playing in real time also enhances the child's expressive language, builds self-esteem, and accomplishes these goals simply by HAVING FUN playing games with family and friends. OBJECTIVE: Each player competes to get the highest score. SETUP: 1. Players choose 2 cards from 8 sets of Picture/Word Cards to play. 2. Players determine which side of the Picture/Word Cards will be used for the game: Side 1, showing all letters of each word to be matched, or Side 2, showing some letters of each word to be matched and there is one missing letter, a blank space that is to be filled in with the correct letter. 3. Go over Vowel Chart so children will remember the sound each vowel makes. GAME PLAY: 1. Two Picture/Word cards with a pool of corresponding letter tiles (face down) are viewed on the screen. 2. First player takes two tiles from the pool to play on either of the two Picture/Word Cards showing on the screen: On the matching side of the Picture/Word cards, player places his 2 tiles correctly on the corresponding letters. On the matching and filling in the missing letters side of the Picture/Word Cards, player places his tiles correctly on the corresponding letters and/or fills in the correct missing letters. 3. If a "Sorry" (a tile with no letter on it) is drawn, player loses one chance to match or fill in a letter. He then places the other tile correctly on the corresponding letter or fills in a blank of either Picture/Word card. The "Sorry" tile is put in a "discard pile." 4. If two "Sorry" tiles are drawn, player loses his turn and play goes to the next player. 5. After a player places his tiles on the Picture/Word cards, the computer will calculate his total number of points for that turn: 1 point for each letter tile matched on the Picture/Word cards; 2 points for each letter tile filled in on a missing letter of the Picture/Word cards; 0 points for the "Sorry" tile; 5 points when a letter tile matched or filled in completes the spelling of the word (Computer will sound out each letter of the word and then says the word). 6. Next player, and then each in turn, takes two tiles and continues in the same manner. 7. Ending the Game: The game ends when players finish matching and/or filling in all letters on the two Picture/Word Cards. The player with the most points is the winner.

FIGS. 12-20 illustrate further preferred embodiment of the subject learning game platform Learning Game. These Figures set forth additional preferred embodiments.

FIG. 12 illustrates an embodiment of a learning game offered by the platform, showing the set-up of an educational learning game—What Do You Hear? The Educational Goal is to teach and reinforce letter recognition, letter sounds and initial sounds of pictures. This game develops fine motor skills by using small muscles in the hands, strengthens eye-hand coordination, encourages interaction between adult and child, and gives adults an opportunity to praise a child when something is done correctly. Playing in real time also enhances the child's expressive language, builds self-esteem, and accomplishes these goals simply by HAVING FUN playing games with family and friends. OBJECTIVE: To cover the most pictures with your color chips. Game Play: 1. First player rolls the dice. 2. The three letters rolled will be named and the sounds they make will be given by the computer. Player then covers those three pictures on the game board by dragging and releasing his color chips with his finger to the correct three pictures that correspond with the sound the letters make. Computer will name the picture and the beginning sound when a player covers the correct picture. The player will choose three pictures, correct or incorrect, per turn. If player chooses an incorrect picture, the computer will say "Incorrect Picture." The computer will also say, "If you hurry and the timer does not run out, you can move your chip to another picture." If a letter rolled has the corresponding picture already covered with a chip, the computer will say, "Letter name picture is taken." Example: "B picture is taken." The Happy Face on the dice is wild and can be used to cover any uncovered picture. The next player, and then each in turn, rolls the dice and continues in the same manner. Ending the Game: Continue until all the pictures are covered. The player who has the most pictures covered with his color chips is the winner. Suggestion: Help may be given to identify the letters and the sounds they make.

FIG. 13a illustrates an embodiment of a learning game offered by the platform, showing the set-up of an educational learning game—Addition with Pegs. FIG. 13b illustrates an embodiment of a learning game offered by the platform, showing the set-up of an educational learning game of FIG. 13a modified for subtraction—Subtraction with Pegs. FIG. 13c illustrates the Game Play rules of FIGS. 13a and 13b.

Referring to FIG. 13a, via the Addition variation, contents of the game include: Unlimited pool of pegs in four colors; Three levels of play: 1. 0-9 dice for Easy; 2. 0-12 dice for Medium; 3. 0-18 dice for Hard; A timer (60 seconds for all levels of play). Selection of Three to Six Turns per game is prompted. Game Play: 1. Players roll dice for the level they have chosen. 2. The number fact will be shown in the yellow message bar as: 6+12=, and a recorded voice will also say 6+12=_. 3. The player will tap in the answer on a calculator-type graphic. Example: the answer is 18, so the player will tap the 1 and 8 and hit Enter for the answer 18. The computer will send 18 pegs from the pool into the player's circle/box. If the player enters a lower or higher number than the correct answer, the pegs will not come down from the pool to the player's box. A recorded voice will say: "Your answer is not correct. If you hurry and the timer does not run out, you can change your answer." If the player enters the correct number for the answer, the pegs will then go into the player's box from the pool. If the player does not enter the correct answer before the timer runs out a recorded voice will say, "Sorry, your time has run out. Better luck next time." The play goes to the next player. At each player's turn the number of pegs will be displayed in his player's box. There will be a running total of all pegs brought to the player's box from the pool until the number of turns for the game has been reached. Ending of the Game: The game ends when each player has had the number of turns for the game as decided in the beginning of the game. The Winner is the player with most number of pegs in his player's box. Tie Breaker. As simple as rolling the dice used in the game to see who gets the highest sum of the number fact to be the winner of the game.

Referring to FIGS. 13b and 13c, via the Subtraction variation, contents include: Pegs in four colors in the player's box; Three levels of play: a. 0-9 dice for easy & 54 pegs in each player's box (with the number 54 displayed in the middle of the player's box); b. 0-12 dice for med. & 72 pegs in each player's box (with the number 72 displayed in the middle of the player's box); c. 0-18 dice for hard & 108 pegs in each player's box (with the number 108 displayed in the middle of the player's box); A timer is provided/recommended (60 seconds for all levels of play); Four Players' Boxes Except the total of pegs for each player will be displayed in the middle of the player's box: a) Easy level: each player has 54 displayed in the middle of the player's box; b) Med level: each player has 72 displayed in the middle of the player's box; c) Hard level: each player has 108 displayed in the middle of the player's box. Selection of Three to Six Turns per game. Game Play: 1. Players roll dice for the level they have chosen. 2. The number fact will be shown in the yellow message bar as: 18−6=, and a recorded voice will also say 18−6=_. 3. The player will tap in the answer on a calculator-type graphic. Example: the answer is 12, so the player will tap the 1 and 2 and hit Enter for the answer 12. The computer will send 12 pegs from the player's circle/box into the pool. If the player enters a lower or higher number than the correct answer, the pegs will not leave the player's box to go to the pool. A recorded voice will say: "Your answer is not correct. If you hurry and the timer does not run out, you can change your answer." If the player enters the correct number for the answer, the pegs will then go from the player's box to the pool. If the player does not enter the correct answer before the timer runs out a recorded voice will say, "Sorry, your time has run out. Better luck next time." The play goes to the next player. At each player's turn the number of pegs removed from his player's box will be subtracted from the number displayed in the middle of his player's box. There will be a running difference of all pegs taken from the player's box and brought to the pool until the number of turns for the game has been reached. Players must get the exact number needed to put their pegs into the pool. Example: A player has a number fact with the answer 4 and he only has 3 pegs left in his player's box. A recorded voice will say, "Sorry, you do not have enough pegs. Better Luck on your next turn." The player will lose this one turn and the play will go to the next player. The player that lost his turn will try again on his next turn. Ending of the Game: The game ends when a player has no pegs remaining in his player's box or when each player has had the number of turns for the game as decided in the beginning of the game. The Winner is the player with least number of pegs in his player's box. Tie Breaker. As simple as rolling the dice used in the game to see who gets the lowest difference of the number fact to be the winner of the game.

FIG. 14a illustrates an embodiment of a learning game offered by the platform, showing the set-up of an educational learning game—Give And Take, showing the Game Play and objectives. FIG. 14b illustrates an embodiment of a learning game offered by the platform, showing the set-up of an educational learning game of FIG. 14a setting forth a Game Play money poems. The Educational Goal of this game is to reinforce coin recognition, learn names and values of coins, and learn to count money. This game promotes positive relationships between parents and children, and gives adults an opportunity to praise a child when something is done correctly. Playing in Real Time encourages family unity, builds self-esteem, creates wonderful memories and accomplishes these goals simply by HAVING FUN playing games with family and friends. AGES: 4 TO 8+; NUMBER OF PLAYERS: 2 to 4; OBJECTIVE: To be the player with the highest amount of money. CONTENTS: A Spinner, pictures of coins front and back: nickels, dimes, quarters, 60 pennies, a Picture Chart of coins. OBJECTIVE: Each player competes for the highest amount of money. SETUP: There is a pool of coins. Review Picture Chart and discuss names and values of coins. Each player has two dollars as his own money: five quarters, four dimes, five nickels, ten pennies, and that are placed in each player's box. GAME PLAY: The first player spins the spinner and the computer will announce the amount pointed to by the arrow. "Take" means player takes the amount of money shown on spinner from the pool and puts that amount to his own pile of money. "Give" means player puts into the pool the amount of money shown on the spinner. Each player in turn continues playing in the same manner until each player has had six turns to spin the spinner. If a player gives the last of his money from his pile. The player does not have to spin the exact amount. Example: The player spins "Give 45 cents," and there is only 30 cents left of his own money. The player will put in the 30 cents of his money. Or players must get the exact amount needed to put their coins into the pool. Example: A player has an amount of "Give 26 cents" and he only has 24 cents left in his player's box. A recorded voice will say, "Sorry, you do not have enough coins. Better Luck on your next turn." The player will lose this one turn and the play will go to the next player. The player that lost his turn will try again on his next turn. If a player needs smaller coins to play during the game, the player can exchange his equal value coins for different coins from the pool. Ending the Game: The game is over when each player has had the number of turns chosen at the beginning of the game to spin the spinner as a full game or when a player loses all his own money. The player that has the largest amount of money as calculated by the computer for each player at the end of each player's turn is the winner. Use the chart provided whenever needed.

FIG. 15 illustrates an embodiment of a learning game offered by the platform, showing the set-up of an educational learning game—Lucky Letters Dice Game—Capital Letters. The Education Goal of this game is to teach and reinforce recognition of capital letters. This game develops fine motor skills by using small muscles in the hands, strengthens eye-hand coordination, allows interaction between adult and child which encourages family unity and creates wonderful memories, and gives adults an opportunity to praise a child when something is done correctly. Playing in real time also enhances the child's expressive language, builds self-esteem, and accomplishes these goals simply by HAVING FUN playing games with family and friends. OBJECTIVE: To be the player to cover the most letters with his chips. GAME PLAY: Player rolls dice to get three letters. The three letters rolled will be named by voice. Player then covers those three letters by dragging and releasing his chip with his finger onto the correct letters on the game board. The Happy Face on the dice is wild and can be used to cover any letter that is not already covered with a chip. If the player chooses the incorrect letter his chip will not stay on the game board and the computer will say, "If you hurry and the timer does not run out, you can move your chip to another letter." If any letters rolled are already covered with a chip, a voice will say the name of the letter and then say, "is covered." Example: "t is covered." Each player, in turn, rolls the dice and continues in the same manner. Ending the Game: Continue until all letters are covered. The player who has the most letters covered with his chips is the winner. Suggestion: Help may be given to identify the letters.

FIG. 16 illustrates an embodiment of a learning game offered by the platform, showing the set-up of an educational learning game—Match and Missing Letters—Three Letter Words. The Education Goal of this game is to recognize and sound out three letter short vowel words. This game develops fine motor skills by using small muscles in the hands, strengthens eye-hand coordination, and allows interaction between adult and child which encourages family unity and creates wonderful memories, and gives adults an opportunity to praise a child when something is done correctly. Playing in real time also enhances the child's expressive language, builds self-esteem, and accomplishes these goals simply by HAVING FUN playing games with family and friends. OBJECTIVE: Each player competes to get the highest score. SETUP: 1. Players choose 2 cards from 8 sets of Picture/Word Cards to play. 2. Players determine which side of the Picture/Word Cards will be used for the game: Side 1: showing all letters of each word to be matched and player places his 2 tiles correctly on the corresponding letters; Side 2: showing some letters of each word to be matched and there is one missing letter, a blank space that is to be filled in with the correct letter. Player places his tiles correctly on the corresponding letters and/or fills in the correct missing letters. 3. Go over Vowel Chart so children will remember the sound each vowel makes. GAME PLAY: 1. Two Picture/Word cards with a pool of corresponding letter tiles (face down) are viewed on the screen. 2. Each player in turn takes two tiles from the pool and correctly places them on either of the two Picture/Word Cards viewed on the screen. 3. If a "Sorry" (a tile with no letter on it) is drawn, player loses one chance to match or fill in a letter and places the other tile correctly on the corresponding letter or fills in a blank of either Picture/Word card. The "Sorry" tile is put in a "discard pile." 4. If two "Sorry" tiles are drawn, player loses his turn and play goes to the next player. 5. After a player places his tiles on the Picture/Word cards, the computer will calculate his total number of points for that turn: 1 point for each letter tile matched correctly on the Picture/Word cards; 2 points for each letter tile filled in correctly on a missing letter of the Picture/Word cards; 0 points for tile placed incorrectly; 0 points for the "Sorry" tile; 5 points when a letter tile matched or filled in completes the spelling of the word (Computer will sound out each letter of the word and then says the word). 6. Next player, and then each in turn, takes two tiles and continues in the same manner. Ending the Game: The game ends when players finish matching and/or filling in all letters on the two Picture/Word Cards. The player with the most points is the winner.

FIG. 17a illustrates an embodiment of a learning game offered by the platform, showing the set-up of an educational learning game—Roll'em—Three Games in One, showing Game One. FIG. 17b illustrates an embodiment of a learning game offered by the platform, showing the set-up of an educational learning game—Roll'em—Three Games in One, of FIG. 17a, showing Game Two. FIG. 17c illustrates an embodiment of a learning game offered by the platform, showing the set-up of an educational learning game—Roll'em—Three Games in One, of FIG. 17a, showing Game Three.

Referring to FIG. 17a, the Educational goal of the game is to teach and reinforce number recognition and adding numbers. This game develops fine motor skills by using small muscles in the hands, strengthens eye-hand coordination, encourages interaction between adult and child, and gives adults an opportunity to praise a child when something is done correctly. Playing in real time also enhances the child's expressive language, builds self-esteem, and accomplishes these goals simply by HAVING FUN playing games with family and friends. OBJECTIVE: Each player competes to get the highest score. GAME ONE: RED DICE FOR NUMBER RECOGNITION ONLY (1 to 6 on one dice and 4 to 9 on the other dice): 1. First player rolls dice. 2. Player will touch the green numbers on Number Sign that correspond with the numbers rolled on the dice so the red numbers will now be displayed. Example: 4 and 7 are rolled on the dice. Player will touch the 4 and 7 green numbers on the Number Sign and the red 4 and 7 will be displayed. 3. The same player continues his turn to play as long as one of the numbers of the dice rolled corresponds to the green numbers on the Number Sign. If neither of the numbers rolled on the dice correspond with any green numbers remaining on the Number Sign, this is the end of the first player's turn. The total of red numbers showing on the Number Sign is his score for the game. The second player, and then each in turn, repeats the process above. Repeat process until all players have had a turn. Ending of Game: Player with the highest score after all players have had a turn wins the game. Tie Score: The tying players play again. Whoever gets the first highest score in an equal number of turns is the winner.

Referring to FIG. 17b, GAME TWO: WHITE DICE FOR NUMBER RECOGNITION AND ADDITION (1 to 6 on both dice): 1. Play as above except player touches the green numbers to correspond to the numbers on the dice or any one, two or three green numbers that are the sum of the numbers rolled on the dice. Example: 6 and 2 are rolled on the dice. The player can touch the green numbers 6 and 2, 8, or any two numbers that will add up to 8, such as: (7 and 1), (5 and 3), or any three numbers that will add up to 8, such as: (1, 3 and 4), (1, 2 and 5), provided the numbers needed are green on the Number Sign. 2. The first player continues his turn to play as long as both of the numbers of the dice rolled corresponds or is the sum of any green numbers remaining on the Number Sign. 3. The total of red numbers showing on the Number Sign is his score for the game. 4. The second player, and then each in turn, repeats the process above. 5. Repeat process until all players have had a turn. Ending of Game: Player with the highest score after all players have had a turn wins the game.

Referring to FIG. 17b, GAME THREE: YELLOW DICE FOR NUMBER RECOGNITION AND ADDITION WITH HELP (1 to 6 with corresponding stars next to the numbers on both dice): 1. Play the same as White Dice except help child with addition as follows, tell him to take the largest number and then look at the little stars next to lowest number die and count from the larger number. Example: The numbers rolled are 6 and 2 or 6+2=8. The largest number is 6. Then pointing at each star on the lowest number dice (2), count 6 . . . 7, 8. 6+2=8. Another Example: The numbers rolled are 5 and 4 or 5+4=9. The largest number is 5. Then pointing at each star on the lowest number dice (4), count 5 . . . 6, 7, 8, 9. 5+4=9. 2. Children can count the stars next to the green numbers on the Number Sign to get the sum of 3 different numbers when necessary. Example: The numbers rolled are 5 and 6 or 5+6=11. When using 3 numbers to make the sum of 11, you can touch the numbers (3,2, and 6); (4,2, and 5); or (4,1, and 6). Take the largest number of the three numbers and then pointing and counting each star next to the lower numbers will help children get the correct sum. The total of red numbers showing on the Number Sign is his score for the game. The second player, and then each in turn, repeats the process above. Repeat process until all players have had a turn. Ending of Game: Player with the highest score after all players have had a turn wins the game.

FIG. 18 illustrates an embodiment of a learning game offered by the platform, showing the set-up of an educational learning game—Spin For Numbers 0-25. The Educational Goal of the game is to teach and reinforce number recognition and sequence of numbers 0 to 25. This game develops fine motor skills by using small muscles in the hands, strengthens eye-hand coordination, allows interaction between adult and child which encourages family unity and creates wonderful memories, and gives adults an opportunity to praise a child when something is done correctly. Playing in real time also enhances the child's expressive language, builds self-esteem, and accomplishes these goals simply by HAVING FUN playing games with family and friends. AGES: 4 to 7; OBJECTIVE: To cover the most numbers with your color chips. Game Play: 1. First player rotates the spinner by pushing the button in the middle of the Spinner. 2. The two numbers that are pointed to on both sides of the spinner arrow will be named by the computer. 3. Player then covers those two numbers with the matching blue numbers around the spinner by dragging and releasing his color chips with his finger to the correct numbers. 4. The Happy Face on the spinner is wild and can be used to play any number that is not already covered with a chip. If any number that a player spins is already covered with a chip, computer will say the name of the number and then say "is covered." Example: "24 is covered." If the player chooses the incorrect number his chip will not stay on the game board the computer will say, "If you hurry and the timer does not run out, you can move your chip to another number." Next player rotates the spinner and continues in the same manner. Ending the Game: Continue until all the numbers are covered. The player who has the most numbers covered with his color chips is the winner. Suggestion: Help may be given to identify the numbers.

FIG. 19 illustrates an embodiment of a learning game offered by the platform, showing the set-up of an educational learning game—ABC Recall—Capital Letters. The Educational Goal of this game is to teach and reinforce recognition of capital letters. This game develops fine motor skills by using small muscles in the hands, strengthens eye-hand coordination, and allows interaction between adult and child which encourages family unity and creates wonderful memories, and gives adults an opportunity to praise a child when something is done correctly. Playing in real time also enhances the child's expressive language, builds self-esteem, and accomplishes these goals simply by HAVING FUN playing games with family and friends. AGES: 3 to 7; NUMBER OF PLAYERS: 2 to 4 players; OBJECTIVE: To collect the most matched sets of two. SETUP: Five groups containing two of each letter as follows: Group 1—A through F; Group 2—G through L; Group 3—M through R; Group 4—S through X; Group 5—Y, Z, M, N, G, and Q. Game Play: On each turn, a player chooses two pictures (one at a time). If the letters match, the player receives one point and takes another turn. The computer will keep a running total of points for each player on their turn. If the player gets another match he gets another turn until he does not make a match before it goes to the next player. When a player chooses two pictures that are not matching letters, it becomes the next player's turn. Ending of Game: Continue play in the same manner until all letters are matched. The winner is the player with the most points. Variations: 18, 24, and 36 letters to a game.

FIG. 20a illustrates an embodiment of a learning game offered by the platform, showing the set-up of an educational learning game—Highest Count, showing set-up and Game Play. FIG. 20b illustrates an embodiment of a learning game offered by the platform, showing the set-up of an educational learning game of FIG. 20a, showing implementation of a money poem. Referring to FIGS. 20a and 20b, the Educational Goal of the game is to teach and reinforce recognition, value and counting of coins. This game promotes positive relationships between parents and children, and gives adults an opportunity to praise a child when something is done correctly. Playing in Real Time encourages family unity, builds self-esteem, creates wonderful memories and accomplishes these goals simply by HAVING FUN playing games with family and friends. OBJECTIVE: To accumulate the most money at the end of the game. GAME PLAY: 1. Parent or player reads aloud the two money poems found at the end of the directions. These poems will help players recognize coins easily and to remember the value of each coin. 2. The first player rolls the dice. The computer will identify the pictures of each coin on the dice. 3. Player takes the coins pictured on the dice from the beach rafts. Example: The nickel, dime and quarter are rolled. The player takes one nickel, one dime and one quarter from the rafts by dragging and releasing the coins with his finger to start a pile of coins in front of him. The player will choose three coins, correct or incorrect, per turn. The computer will name the coin when the player takes the correct coin from the beach raft. If player takes an incorrect coin the computer will say, "Incorrect Coin." 4. The next player, and then each in turn, roll the dice and continue in the same manner. Ending the Game: The game ends after each player has 6 turns to roll the dice. Through visual demonstration the computer will count the amount of money each player has accumulated. The player with the most amount of money wins the game. In case of a tie, the two players will take an additional roll of the dice to get a higher amount of money. Money poems one and two are provided to facilitate learning.

FIG. 21 illustrates another embodiment of a subject learning game platform Learning Game—Word Recall—Sight Vocabulary Words. The Educational Goal of the game is to teach and reinforce recognition of sight words. This game develops fine motor skills by using small muscles in the hands, strengthens eye-hand coordination, allows interaction between adult and child which encourages family unity and creates wonderful memories, and gives adults an opportunity to praise a child when something is done correctly. Playing in real time also enhances the child's expressive language, builds self-esteem, and accomplishes these goals simply by HAVING FUN playing games with family and friends. AGES: 3 to 7; NUMBER OF PLAYERS: 2 to 4 players; OBJECTIVE: To collect the most matched sets of two. SETUP: Five groups of two sets of six sight words. GAME PLAY: On each turn, a player chooses two pictures (one at a time). The computer will keep a running total of points for each player on their turn. If the words match, the player receives one point and takes another turn. If the player gets another match he gets another turn until he does not make a match before it goes to the next player. When a player chooses two pictures that are not matching words, it becomes the next player's turn. Ending of Game: Continue play in the same manner until all words are matched. The winner is the player with the most points. Variations: 18, 24, and 36 pictures to a game.

FIGS. 22a and 22b illustrate another embodiment of a subject learning game platform Learning Game—Word Puzzles, Sight Vocabulary Words. The Educational Goal of this game is to teach and reinforce recognition of sight words. This game develops fine motor skills by using small muscles in the hands, strengthens eye-hand coordination, promotes positive relationships between parents and children, and gives adults an opportunity to praise a child when something is done correctly. Playing in Real Time encourages family unity, enhances a child's expressive language, builds self-esteem, creates wonderful memories and accomplishes these goals simply by HAVING FUN playing games with family and friends. CONTENTS: digital word cards for each vowel, tiles, four tile racks. OBJECTIVE: Each player competes to get the highest score. SETUP: Mix Word Cards and place them face down in a pile. Place all letter tiles face down in the middle of the table and mix them up. All players draw eight new letters each and place them in their racks, and take one Word Card from the pile. Maximum number of turns per game is six. GAME PLAY: 1. The first player matches his tiles to the red letters on his Word Card. Black letters on Word Cards remain unmatched. He then draws as many new letters as he played, always keeping eight letters on his rack, as long as there are enough left on the table. 2. Play passes to the left. The second player, and then each in turn, continues in the same manner, matching their tiles to the red letters on their Word Card and drawing as many new letters as were played. 3. If you have no tiles to match your Word Card you will exchange all of your letters. To do this, place your discarded letters face down in front of you. Draw eight new letters from the pool, then mix your discarded letters into the pool. This ends your turn. 4. On the sixth turn do not replace tiles that were played. Also on the sixth turn, if no tiles can be matched, player receives no points and his tiles remain in his rack. Ending the Game: The game ends when all letters have been drawn, each player has had six turns or someone has matched all the red letters on their card. Scoring, as set forth in FIG. 22b, is carried out as follows: 5 points are given for each completely matched word, except for the vowels. 1 point is given for each letter matched in an incomplete word. The player with the highest score is the winner. In case of a tie, the players deduct one point for each un-played letter in their rack.

FIG. 23 illustrates another embodiment of a subject learning game platform Learning Game—Spin for Words—Sight Vocabulary Words. The Educational Goal of this game is to teach and reinforce word recognition. This game develops fine motor skills by using small muscles in the hands, strengthens eye-hand coordination, and allows interaction between adult and child which encourages family unity and creates wonderful memories, and gives adults an opportunity to praise a child when something is done correctly. Playing in real time also enhances the child's expressive language, builds self-esteem, and accomplishes these goals simply by HAVING FUN playing games with family and friends. AGES: 4 to 8; OBJECTIVE: To cover the most words with your color chips. Game Play: 1. First player rotates the spinner by pushing the button in the middle of the Spinner. 2. The two words that are pointed to on both sides of the spinner arrow will be named by the computer. 3. Player then covers those two words with the matching words on the board by dragging and releasing his color chips with his finger to the correct words. 4. The Happy Face on the spinner is wild and can be used to play any word that is not already covered with a chip. 5. If any word that a player spins is already covered with a chip, computer will say the name of the word and then say "is covered." Example: "Cat is covered." 6. If the player chooses the incorrect word his chip will not stay on the game board and the computer will say, "If you hurry and the timer does not run out, you can move your chip to another word." 7. Next player rotates the spinner and continues in the same manner. Ending the Game: Continue until all the words are covered. The player who has the most words covered with his color chips is the winner. Suggestion: Help may be given to identify and sound out words.

FIGS. 24a and 24b illustrate another embodiment of a subject learning game platform Learning Game—Fishing for Words Sight Vocabulary. The Education Goal of this game is to teach and reinforce recognition of sight words. This game develops fine motor skills by using small muscles in the hands, strengthens eye-hand coordination, and allows interaction between adult and child which encourages family unity and creates wonderful memories, and gives adults an opportunity to praise a child when something is done correctly. Playing in real time also enhances the child's expressive language, builds self-esteem, and accomplishes these goals simply by HAVING FUN playing games with family and friends. AGES: 3 to 6; Objective: To be the player with the highest score. Setup: There will be several sets of 24 words each that the player will use to play in the game. There will be a number of "Sorry" fish that have no points when caught. The players will also decide how many turns each player will have for a full game. The players can choose 3 to 6 turns for each player as a full game. Game Play: 1. First player using the mouse to click on the fish with a word that is swimming by. The fish will turn over so the word is seen and the computer will announce the word name and sound out the word. Each word caught receives 1 point. 2. If a "Sorry" fish is caught, the player receives 0 points. The computer will keep a running score for each player at the end of the player's turn. 3. Next player, and then each in turn, catch a fish and continue in the same manner. Ending the Game: The game ends at the finish of the number of turns that was chosen at the beginning of the game. The player with the most points is the winner. Scoring: Fish with a word—1 point; Fish that has "Sorry"—0 points. If there is a tie, those players have another turn to break the tie by rolling dice.

FIGS. 25a and 25b illustrate another embodiment of a subject learning game platform Learning Game—Match And Missing Letters—Sight Vocabulary Words. The Educational Goal of this game is to teach and reinforce recognition of sight vocabulary words. This game develops fine motor skills by using small muscles in the hands, strengthens eye-hand coordination, allows interaction between adult and child which encourages family unity and creates wonderful memories, and gives adults an opportunity to praise a child when something is done correctly. Playing in real time also enhances the child's expressive language, builds self-esteem, and accomplishes these goals simply by having fun playing games with family and friends. OBJECTIVE: Each player competes to get the highest score. SETUP: 1. Players choose 2 cards from 8 sets of Word Cards to play; 2. Players determine which side of the Word Cards will be used for the game: Side 1, showing all letters of each word to be matched, or Side 2, showing some letters of each word to be matched and there is one missing letter, a blank space that is to be filled in with the correct letter. Game Play: 1. Two Word cards with a pool of corresponding letter tiles (face down) are viewed on the screen. 2. First player takes two tiles from the pool to play on either of the two Word Cards showing on the screen: a. On the matching side of the Word cards, player places his 2 tiles correctly on the corresponding letters; b. On the matching and filling in the missing letters side of the Word Cards, player places his tiles correctly on the corresponding letters and/or fills in the correct missing letters. 3. If a "Sorry" (a tile with no letter on it) is drawn, player loses one chance to match or fill in a letter. He then places the other tile correctly on the corresponding letter or fills in a blank of either Word card. The "Sorry" tile is put in a "discard pile." 4. If two "Sorry" tiles are drawn, player loses his turn and play goes to the next player. 5. After a player places his tiles on the Word cards, the computer will calculate his total number of points for that turn: 1 point for each letter tile matched on the Word cards; 2 points for each letter tile filled in on a missing letter of the Word cards; 0 points for the "Sorry" tile; 5 points when a letter tile matched or filled in completes the spelling of the word (Computer will sound out each letter of the word and then says the word). 6. Next player, and then each in turn, take two tiles and continue in the same manner. Ending the Game: The game ends when players finish matching and/or filling in all letters on the two Word Cards. The player with the most points is the winner.

The foregoing descriptions of specific embodiments of the present disclosure have been presented for purposes of illustration and description. Each of the games set forth can be modified for digital versions for Game Play on an electronic device wherein software integrated within the platform performs the various tasks and computations. Each of the games set forth can be modified for non-digital use for boards games, card games, dice games, and/or domino games. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated. These embodiments, as well as the modifications and variations thereof, are intended to fall within the scope of the invention, as defined by the subjoined claims

What is claimed is:

1. A system for a learning game platform for an electronic device/mobile device comprising:
   a. a server for reading medium and storing user information and games, scores, and user progress within a play and learn app platform;
   b. said server communicating through the Internet with electronic devices having Internet access operated by at least one player;
   a. registration for allowing said player to register with and logon to said play and learn app;
   c. preference selection for providing said player ability to enter user preferences, including age, game selection of at least one learning game for one or more reading, memory recall, letter recognition, letter sound or picture match subject matter, and skill level;
   d. performance review selection to determine strength and weaknesses of said player comprising an assessment test based on age/grade level of said player to determine subject matter needing practice by said player;
   e. one or more digital game setup comprising at least one of a letter, picture or word game adapted to be utilized for one or more game play variation.

2. The system of claim 1, wherein said game play variation include game execution and instructions attending to at least one letter recognition game, three, four and five letter short vowel word, and four and five letter long vowel word games.

3. The system of claim 1, wherein said game setup comprises a digital card deck having a plurality of letter cards and said game play variation comprises letter recall comprising letter recognition and memory recall with a game objective of collecting a greatest number of matched letter sets resulting in points, wherein game setup comprises separating said letter cards one or more groups containing matching said letter cards.

4. The system of claim 3, wherein said game play variation comprises difficulty level based on age and time limits per turn, including: ages 3-5, no time requirement, ages 6-7, about 3 minutes; and ages 8 and above, about 1 minute.

5. The system of claim 1, wherein said game setup comprises a digital card deck having at least two picture/word cards missing letters, a plurality of digital letter tiles showing all letters of each of said picture/word cards to be matched, and at least one digital sorry tile with no letter on it, and said game play variation comprises points for matching and missing letter by filling in all letters on said picture/word cards with corresponding said digital letter tiles to teach and reinforce recognition and sounding out of words and to develop fine motor skills.

6. The system of claim 5, wherein said picture/word cards comprise four and five letter long vowel words.

7. The system of claim 5, wherein said picture/word cards comprise four and five letter short vowel words.

8. The system of claim 5, wherein said picture/word cards comprise three letter short vowel words.

9. The system of claim 5, wherein said picture/word cards have a first side showing all letters of each word to be matched and a second side showing some letters of each word to be matched with a missing letter and a blank space that is to be filled in with said missing letter, wherein said picture/word cards are shown with a plurality of face down said digital letter tiles and said sorry tile.

10. The system of claim 1, wherein said game setup comprises a digital game board having at least two picture cards, a plurality of color chips, and at least one dice having faces with a letter on each face, and wherein each letter is named and a corresponding audible sound is generated, wherein said game play variation comprises points for said color chips resulting from matching said letter with each of said picture card to teach and reinforce letter recognition, letter sounds and initial sound of pictures and to develop fine motor skills.

11. The system of claim 1, wherein said game setup comprises a digital game board having at least two letter cards, a plurality of chips, and at least one dice having faces with a letter on each face, and wherein each letter is named and a corresponding audible sound is generated, wherein said game play variation comprises points for covering said letter cards with said chips to teach and reinforce letter recognition, letter sounds and initial sound of pictures and to develop fine motor skills.

12. The system of claim 1, wherein said game setup comprises a digital card deck having matching picture/sight word cards, wherein said game play variation comprises points for collecting match sets of two for word recall and sight vocabulary words matching to teach and reinforce recognition of sight words and develop mine motor skills.

13. The system of claim 1, wherein said game setup comprises a digital card deck having matching picture/sight word cards and a plurality of digital letter tiles, wherein said game play variation comprises points for collecting match sets of two for word puzzles and sight vocabulary words matching to teach and reinforce recognition of sight words and develop fine motor skills.

14. The system of claim 1 comprising a plurality of chips and a spinner, wherein said game setup comprises a digital game board having sight word cards, said game play variation comprises points for covering said sight word cards with said chips to teach and reinforce word recognition and to develop fine motor skills.

15. A system for a learning game platform for an electronic device/mobile device comprising:
   a. a server for reading medium and storing user information and games, scores, and user progress within a play and learn app platform;
   b. said server communicating through the Internet with electronic devices having Internet access operated by at least one player;
   c. registration for allowing said player to register with and logon to said play and learn app;
   d. preference selection for providing said player ability to enter user preferences, including age, game selection of at least one learning game for one or more reading, memory recall, letter recognition, letter sound and picture match subject matter, and skill level;

e. performance review selection to determine strength and weaknesses of said player comprising an assessment test based on age/grade level of said player to determine subject matter needing practice by said player;

f. a plurality of digital dominoes comprising letter dominoes and one or more picture face domino to be utilized for one or more game play variation.

16. The system of claim 15, wherein said digital letter dominoes comprise capital letters and said picture face domino is a happy face domino, wherein said game play variation comprises points for collecting match sets of two for letter recognition and recall to teach and reinforce letter recognition and develop fine motor skills.

17. A system for a learning game platform for an electronic device/mobile device comprising:

a. a server for reading medium and storing user information and games, scores, and user progress within a play and learn app platform;

b. said server communicating through the Internet with electronic devices having Internet access operated by at least one player, c. registration for allowing said player to register with and logon to said play and learn app;

d. preference selection for providing said player ability to enter user preferences, including age, game selection of at least one learning game for one or more reading, memory recall, letter recognition, letter sound and picture match subject matter, and skill level;

e. performance review selection to determine strength and weaknesses of said player comprising an assessment test based on age/grade level of said player to determine subject matter needing practice by said player;

f. a plurality of digital currency to be utilized for one or more game play variation.

18. The system of claim 17 comprising a spinner, pictures of coins front and back including nickels, dimes, quarters, and pennies, and a picture chart of coins, wherein said game play variation comprises accumulating money to teach and reinforce coin recognition, learn names and values of coins, and learn to count money and develop fine motor skills.

* * * * *